(12) United States Patent
Jin

(10) Patent No.: US 10,361,837 B2
(45) Date of Patent: Jul. 23, 2019

(54) SELECTIVE PROXY TO ALLEVIATE ADJACENT CHANNEL INTERFERENCE IN FULL DUPLEX CABLE NETWORK ENVIRONMENTS

(71) Applicant: CISCO TECHNOLOGY, INC., San Jose, CA (US)

(72) Inventor: Hang Jin, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 15/625,940

(22) Filed: Jun. 16, 2017

(65) Prior Publication Data

US 2018/0367290 A1    Dec. 20, 2018

(51) Int. Cl.
   *G06F 11/00*    (2006.01)
   *H04L 5/14*    (2006.01)
   (Continued)

(52) U.S. Cl.
   CPC .......... *H04L 5/1461* (2013.01); *H04L 1/1867* (2013.01); *H04L 1/203* (2013.01);
   (Continued)

(58) Field of Classification Search
   CPC ....... H04L 47/31; H04L 1/203; H04L 1/1867; H04L 43/0847
   See application file for complete search history.

(56) References Cited

U.S. PATENT DOCUMENTS 6,912,209 B1    6/2005   Thi et al.
7,089,478 B2 *  8/2006   Cummings ........... H04L 1/0065
                                                    714/755
(Continued)

FOREIGN PATENT DOCUMENTS

WO    2015/162104    10/2015
WO    2017/048273    3/2017

OTHER PUBLICATIONS

Data-Over-Cable Service Interface Specifications DOCSIS® 3.1 MAC and Upper Layer Protocols Interface Specification, © Cable Television Laboratories, Inc., May 10, 2017, retrieved on May 18, 2017, 838 pages.

(Continued)

*Primary Examiner* — Bo Hui A Zhu
(74) *Attorney, Agent, or Firm* — Merchant & Gould P.C.

(57) ABSTRACT

A method in an embodiment includes calculating a first packet error rate (PER) of a flow sent from a source to a cable modem over a first period of time in a full duplex cable network, tagging the flow based on determining the first PER satisfies a tag threshold associated with the flow, and intercepting, at a selective proxy, a packet of the tagged flow. The method further includes storing a backup of the packet, transmitting the packet to the cable modem, determining the cable modem did not receive the packet, and retransmitting the backup of the packet to the cable modem. Further embodiments include dynamically calculating a second PER of the tagged flow based on a second period of time, determining the second PER satisfies a de-tag threshold, and revoking the tagging of the flow based, at least in part, on determining the second PER satisfies the de-tag threshold.

25 Claims, 8 Drawing Sheets

(51) Int. Cl.
*H04L 1/18* (2006.01)
*H04L 12/833* (2013.01)
*H04L 1/20* (2006.01)
*H04L 12/26* (2006.01)

(52) U.S. Cl.
CPC ............ *H04L 47/31* (2013.01); *H04L 43/026* (2013.01); *H04L 43/0847* (2013.01); *H04L 43/16* (2013.01)

(56) References Cited

U.S. PATENT DOCUMENTS

| | | | |
|---|---|---|---|
| 7,394,769 | B2 | 7/2008 | Banerjee et al. |
| 7,630,305 | B2 | 12/2009 | Samuels et al. |
| 7,856,049 | B2 | 12/2010 | Currivan et al. |
| 7,977,991 | B2 | 7/2011 | Iwakuni |
| 8,457,584 | B2 | 6/2013 | Currivan |
| 8,565,266 | B1 | 10/2013 | Fox et al. |
| 8,594,118 | B2 | 11/2013 | Cooper et al. |
| 9,031,409 | B2 | 5/2015 | Nandiraju et al. |
| 8,937,992 | B2 | 6/2015 | Cooper et al. |
| 9,136,943 | B2 | 9/2015 | Thompson et al. |
| 9,160,463 | B2 | 10/2015 | Hunter |
| 10,003,403 | B1 * | 6/2018 | Cloonan ............ H04B 10/1143 |
| 2005/0122996 | A1 * | 6/2005 | Azenkot ............ H04L 12/2801 370/477 |
| 2012/0269242 | A1 | 10/2012 | Prodan et al. |
| 2013/0194984 | A1 | 8/2013 | Cheng et al. |
| 2013/0332978 | A1 | 12/2013 | Rakib |
| 2014/0012972 | A1 | 1/2014 | Han |
| 2014/0022943 | A1 | 1/2014 | Ling et al. |
| 2014/0133352 | A1 | 5/2014 | Chapman et al. |
| 2015/0082363 | A1 | 3/2015 | Gomez et al. |
| 2015/0188653 | A1 | 7/2015 | Hanks et al. |
| 2015/0188668 | A1 | 7/2015 | Al-Banna |
| 2017/0117999 | A1 | 4/2017 | Weston et al. |
| 2017/0142216 | A1 | 5/2017 | Hinde |

OTHER PUBLICATIONS

Merwyn, "Snooping TCP", Easy Notes, Apr. 23, 2015, 1 page; https://professormerwyn.wordpress.com/2015/04/23/snooping-tcp/.

Chapman, J., et al., "Full Duplex DOCSIS,"Cisco System, Inc., 2015, 29 pages.

Roughan, M., "TCP Flow Controls," Adelaide-Melbourne Grampians Workshop, 1999, 43 pages; http://www.maths.adelaide.edu.au/matthew.roughan/Papers/tcptute.pdf.

"Understanding Data Throughput in a DOCSIS World," Cisco Systems, Inc., Aug. 25, 2008, Document ID: 19220, 24 pages; http://www.cisco.com/c/en/us/support/docs/broadband-cable/data-over-cable-service-interface-specifications-docsis/19220-data-thruput-docsis-world-19220.html.

"What is Cisco Remote-PHY Solution,"Cisco Systems, Inc., Aug. 1, 2014, 20 pages; http://www.cisco.com/c/en/us/td/docs/cable/RemotePhy/solution/b-remote-phy-overview.pdf.

* cited by examiner

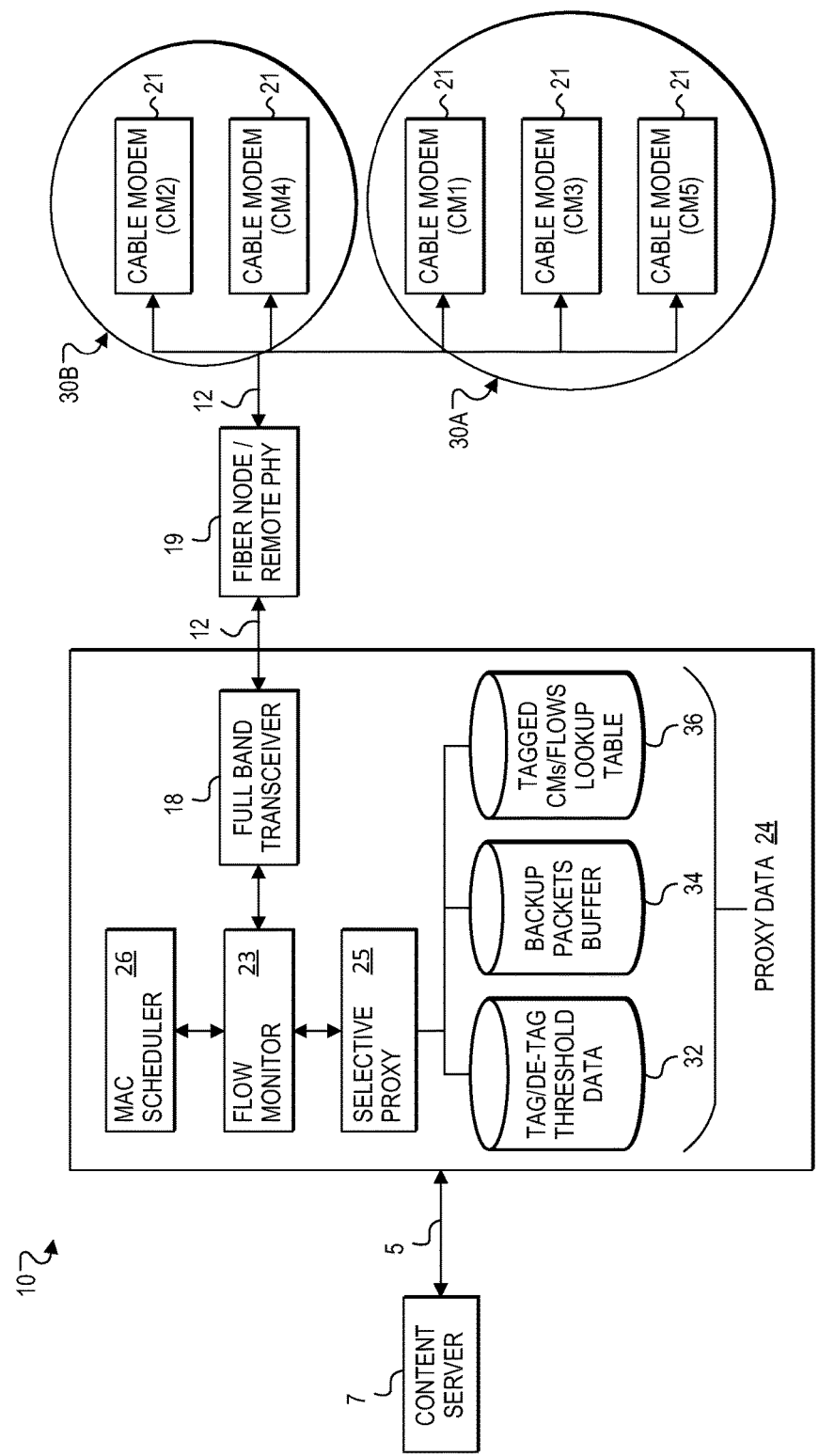

SELECTIVE PROXY TO ALLEVIATE ADJACENT CHANNEL INTERFERENCE IN FULL DUPLEX CABLE NETWORK ENVIRONMENTS

TECHNICAL FIELD

This disclosure relates in general to the field of communications and, more particularly, to a selective proxy to alleviate adjacent channel interference in full duplex cable network environments.

BACKGROUND

Consumer appetite for bandwidth continues to grow exponentially in the cable network market. The typical multi-system operator (MSO) has limited options, due to the inherent technological limitations of existing cable networks. For example, customer demands to extend the frequency spectrum beyond 1.2 GHz would require extensive network upgrades. Upgrades in network components are limited by capital expenditure (CAPEX) budget limitations. Optics (fiber to the home (FTTH) typically have excessive CAPEX. Consequently, some MSOs have responded to the demand to extend the frequency spectrum by implementing a full duplex system in the existing architecture. In a full duplex DOCSIS (Data-Over-Cable Service Interface Specification) system, downstream traffic and upstream traffic run at the same time on the same frequency. Thus, a full duplex (FDX) system theoretically doubles the throughput because the same frequency is used twice, and therefore, the frequency spectrum is not divided between downstream and upstream. A traditional cable system that is converted to an FDX system, however, may experience co-channel and adjacent channel interference. While certain techniques are available to mitigate co-channel interference, adjacent channel interference can still present problems in full duplex cable networks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified block diagram illustrating example details of embodiments of the communication system;

DETAILED DESCRIPTION

Overview

Figure 1:
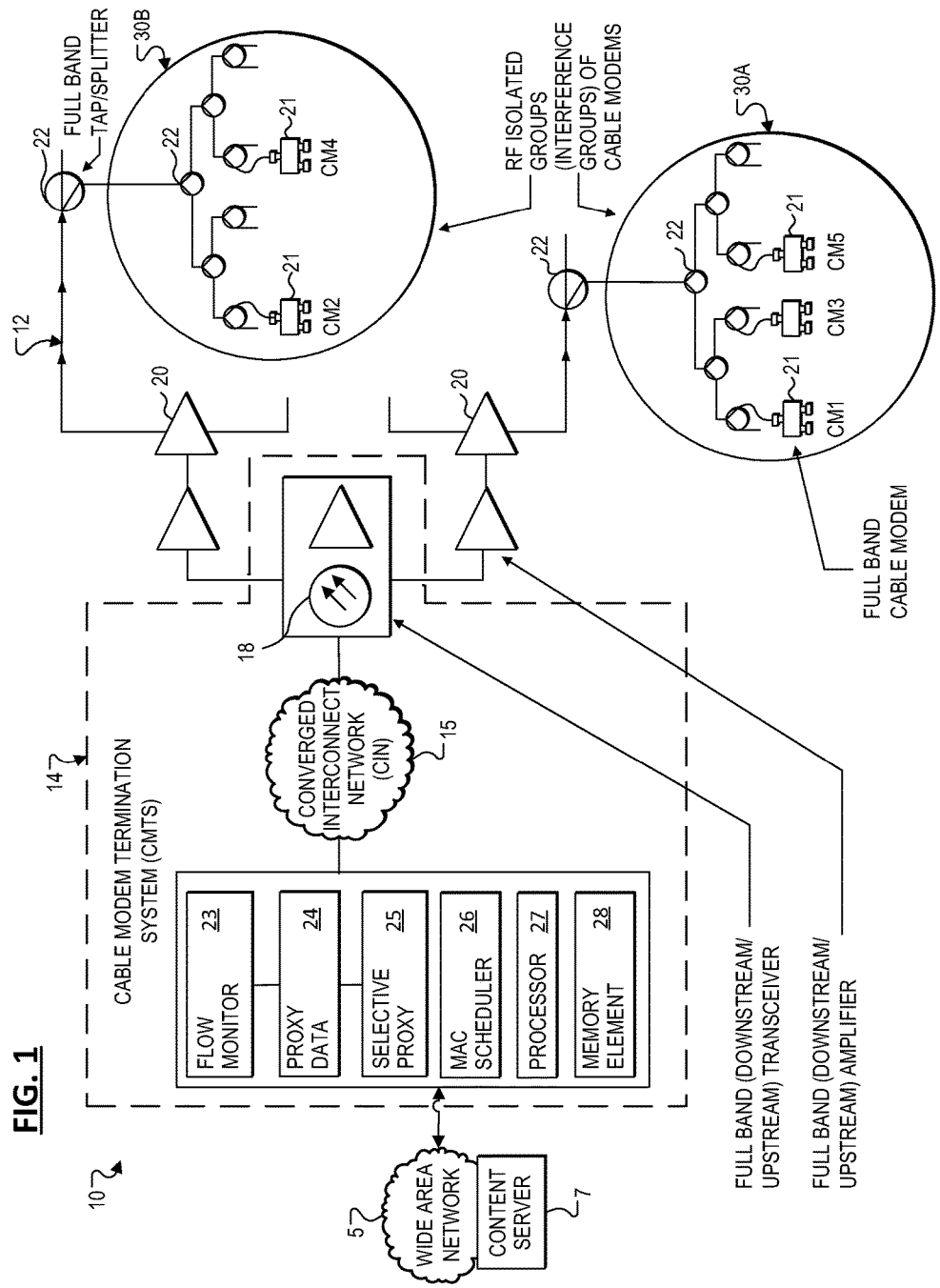
FIG. 1 is a simplified block diagram illustrating a communication system comprising a full duplex network architecture in a cable network environment.

The present disclosure describes methods of alleviating adjacent channel interference in full duplex cable networks using a selective proxy. In one example in the present disclosure, the method comprises calculating a first packet error rate (PER) of a flow sent from a source to a cable modem over a first period of time in a full duplex cable network, tagging the flow based on determining the first PER of the flow satisfies a tag threshold associated with the flow, and intercepting, at a selective proxy, a packet of the tagged flow. The method further includes storing a backup of the packet, transmitting the packet to the cable modem, determining the cable modem did not receive the packet, and retransmitting the backup of the packet to the cable modem.

In some embodiments, the method further includes calculating a second packet error rate (PER) of the cable modem, and tagging the cable modem based on determining the second PER satisfies a tag threshold for the cable modem. The method may further include, subsequent to determining the second PER satisfies the tag threshold for the cable modem, identifying a network traffic type associated with the flow, and determining, based on the identified network traffic type associated with the flow, whether to calculate the first PER of the flow.

In some embodiments, the method further includes dynamically calculating a second PER of the tagged flow based on a second period of time that ended after the first period of time ended, determining the second PER of the tagged flow satisfies a de-tag threshold, and revoking the tagging of the flow based, at least in part, on determining the second PER satisfies the de-tag threshold. The de-tag threshold may be lower than the tag threshold. In more specific embodiments, the revoking the tagging of the flow is based, in part, on determining one or more other packet error rates (PERs) of the tagged flow satisfy the de-tag threshold. The tag threshold and the de-tag threshold may each be configured for the flow.

In some embodiments, the method further includes receiving an acknowledgement message from the cable modem indicating the cable modem received the backup packet, and deleting the stored backup packet.

In some embodiments, determining the packet was not received by the cable modem includes at least one of receiving a duplicate message indicating a different packet of the flow was received by the cable modem and determining a message acknowledging receipt of the packet was not received from the cable modem within a timeout period.

In some embodiments, the tag threshold is based on at least one of a quality of service (QoS) setting associated with the flow, a service level agreement (SLA) associated with the cable modem, historical data associated with the cable modem, historical data associated with the flow, network traffic type associated with the flow, and an application type associated with the flow.

In some embodiments, the method further includes, prior to determining the cable modem did not receive the packet, sending from the selective proxy to the source of the packet, a message indicating the packet was received by the cable modem.

In some embodiments, the method further includes prior to determining that the first PER of the flow satisfies a tag threshold, dynamically determining the tag threshold.

In some embodiments, the tag threshold is dynamically determined based, at least in part, on historical data associated with cable modem.

In some embodiments, tagging the flow includes recording an identifier of the flow.

Some or all of the elements, operations, and features may be included in respective systems, apparatuses, and devices for performing the described functionality. Furthermore, some or all of the features may be implemented in at least one machine readable storage medium.

Embodiments

FIG. 1 is a simplified block diagram illustrating a communication system 10 enabling full duplex network communication in a cable network environment in accordance with an embodiment. FIG. 1 illustrates a cable network 12 (indicated generally by an arrow) facilitating full duplex communication between a cable modem termination system (CMTS) 14 and one or more cable modems (CMs) 21. Network 12 includes transceivers 18, amplifiers 20, and taps and splitters 22. One or more amplifiers 20 may be provided in a fiber node (e.g., in a hybrid-fiber coaxial cable network) or in a remote PHY device (e.g., in a digital fiber cable network). CMTS 14 includes an intelligent media access control (MAC) scheduler 26 that enables a two-dimensional transmission-reception (T-R) coordination for interference avoidance, and a selective proxy 25 that works in conjunction with a flow monitor 23 to alleviate adjacent channel interference associated with cable modems. CMTS 14 also includes at least one processor 27 and at least one memory element 28 that facilitate executing instructions comprised in flow monitor 23, selective proxy 25 and MAC scheduler 26. CMTS 14 may further include a converged interconnect network (CIN) 15, which facilitates communication and network traffic processing within CMTS 14. In various embodiments, cable modems 21 may be grouped into various interference groups 30A and 30B to enable full duplex communication to minimize interference for most cable modems. Groups 30A and 30B may comprise radio frequency (RF) isolated groups that allow frequency re-use through intelligent MAC scheduling.

Transceivers 18 enable full band communication for both upstream and downstream network traffic and may implement dynamic interference cancellation, also referred to herein as adaptive interference cancellation (AIC). Note that as used herein, the term 'upstream' refers to a communication direction from cable modems 21 towards CMTS 14; the term 'downstream' refers to a communication direction from CMTS 14 towards cable modems 21. Amplifiers 20 enable full band communication for both upstream and downstream network traffic, and implement adaptive interference cancellation with ringing (e.g., echo) suppression. Taps and splitters 22 may enable full band communication for downstream and upstream traffic.

Each of cable modems 21 supports full band communication, but may operate in simplex mode for upstream or downstream transmission. For example, in the simplex mode, each of cable modems 21 may be assigned non-overlapping frequency bands for upstream and downstream communication, yet the same set of carriers can be used for the downstream and upstream communication, respectively, yielding a doubling of throughput compared to currently existing non-full duplex systems. Communication system 10 can enable higher bandwidth (e.g., bandwidth is the maximum amount of data that can travel through a communication channel) and throughput (e.g., throughput refers to the quantity of data that actually does travel through the communication channel successfully) through full-duplex communication.

To explain generally, bandwidth limitations are solved in some communication networks through duplex communication. In a general sense, duplex communication is bi-directional, allowing both end nodes of a communication channel to send and receive data simultaneously and one at a time. Both end nodes have the ability to operate as sender and receiver at the same time, or take turns sending or receiving data. Duplex-based systems typically have dual communication channels that provide separate mediums (e.g., paths) for upstream (US) (e.g., uplink, outgoing, transmitting) and downstream (DS) (e.g., downlink, incoming, receiving) communication. In full duplex mode, a node can send and receive signals simultaneously on the same frequency range.

Examples of communication techniques include frequency division duplexing (FDD) and time division duplexing (TDD). In FDD, different frequency bands (e.g., carrier frequencies) are used at the transmitter and receiver. Because FDD uses different frequency bands for upstream and downstream operations, the send and receive functions are separated. Consequently, the upstream and downstream communication do not interfere with each other. In TDD, the upstream communication is separated from the downstream communication by allocation of different time slots in the same frequency range. For example, users, such as cable modems, are allocated time slots for upstream transmission and downstream reception. TDD allows asymmetric flow for upstream and downstream data transmission.

Full duplex communication mechanisms that are not FDD or TDD have not been used in cable networks, because the inherent network architecture and communication protocols do not support such communication mechanisms. For example, cable was first introduced in the United States in the late 1950s. For the next 30 years, nearly every mile of buried cable was half duplex; thus, the network was capable of broadband transmission in the downstream direction, from the head end to the subscriber, but not in the upstream direction—communication from the subscriber back to the head end was possible only via a telephone line. In recent years, cable operators have been investing heavily to upgrade their buried cables from half to full duplex as a necessary first step to capitalize on the demand for integrated data and voice services. However, upstream transmissions continue to be slower than downstream receptions (typically 1.5 to 3 Mbps downstream and 500 Kbps to 2.5 Mbps upstream).

Full Duplex DOCSIS® 3.1 is a new technology created by Cable Television Laboratories (CableLabs) research consortium that supports symmetric 10 Gbps (Gigabit per second) downstream capacity and 1 Gbps upstream capacity over cable networks. DOCSIS (Data-Over-Cable Service Interface Specification) is an international telecommunications standard that defines interface requirements for cable modems and supporting equipment related to high-speed data transfer and distribution over cable networks. In particular, DOCSIS defines a protocol for bi-directional signal exchange between a cable modem termination system (CMTS) operated by cable service providers and cable modems (at multiple customer premises) over a hybrid fiber-coaxial (HFC) cable plant or over digital fiber. The Full Duplex DOCSIS® specification extends the previous generations of specifications to full duplex (two-way transmission) communication system. Media Access Control (MAC) and Physical (PHY) layers are leveraged, in addition to a new PHY layer. DOCSIS® 3.1 can be applied to a coaxial-based broadband access network that is either an all-coax or hybrid-fiber/coax (HFC) network.

Figure 2:
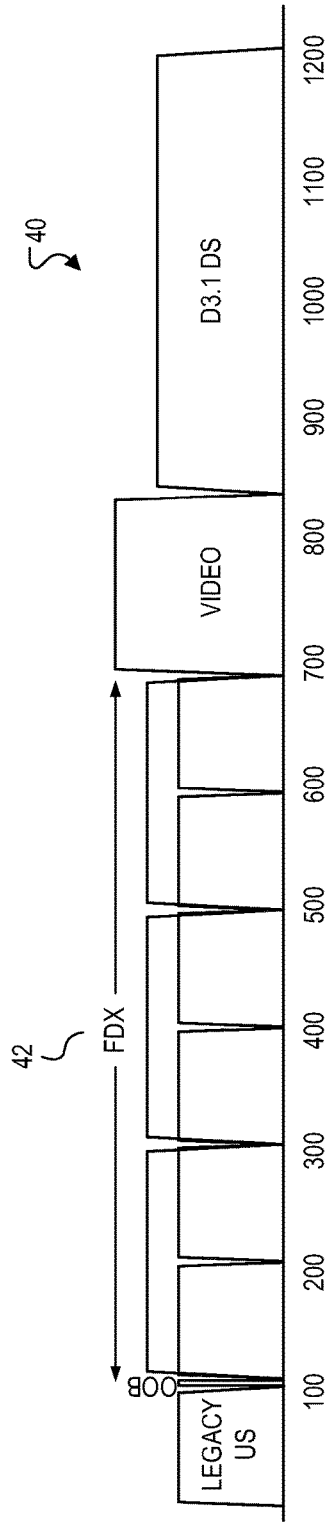
FIG. 2 is a diagram of a frequency spectrum for full duplex cable network environments.

FIG. 2 illustrates a full duplex frequency spectrum allocation 40. In accordance with multi-service operator (MPO) and full duplex (FDX) standards working group, an FDX frequency band 42 is allocated between 108 MHz and 684 MHz. Cable modems that support FDX can transmit and receive in this frequency band 42. Legacy cable modems (3.0/3.1) can receive downstream traffic in FDX band 42 and can share FDX DS channels with FDX cable modems.

While DOCSIS® 3.1 offers significant advantages in capacity, implementing full duplex in existing cable networks creates certain challenges. Interference issues may arise from transmitter to receiver due to the same frequency spectrum being used by the downstream and upstream traffic simultaneously. Interference mitigation techniques differ in remote PHY devices (RPD) and cable modems. RPDs and a CMTS can run a full duplex in which the same frequency spectrum is used by downstream and upstream traffic simultaneously. The interferences from transmission to reception can be mitigated through echo cancellation implemented in the receiver.

Cable modems, however, may still run FDD with complementary channel assignments. Consider the following example of complementary channel assignments: Two cable modems (CM1 and CM2) and two channels (channel 1 and channel 2) are available in a cable network. CM1 uses channel 1 and channel 2 for downstream and upstream traffic, respectively. CM2 uses channel 1 and channel 2 for upstream and downstream traffic, respectively. Thus, with respect to upstream and downstream traffic, the channel assignments are reversed in CM1 and CM2. The complementary channel assignment can result in co-channel interference (CCI) between the CMs. CM2's upstream traffic may interfere with CM1's downstream traffic.

CCI can be mitigated through sounding and CM grouping, which is referred to herein as an interference group (IG). In particular, cable modems experiencing CCI can be grouped into individual IGs, where there is a common FDD channel assignment within each IG. For example, assume five cable modems (CM1, CM2, CM3, CM4, and CM5). CM1, CM3, and CM5 are in close physical proximity (e.g., neighbors), while CM2 and CM4 are located several miles away. Channel 1 is assigned for upstream traffic of CM1 and downstream traffic of CM3. Because there is not a sufficient amount of isolation between CM1 and CM3, when CM1 transmits at the same time that CM3 is receiving, the CM1's upstream traffic may interfere with CM3's downstream traffic. Therefore, CM1 and CM3 can be grouped into an IG (e.g., 30A) where channel 1 is assigned to the upstream traffic of both CM1 and CM3, and a different channel is assigned to the downstream traffic of CM1 and CM3. CM2 and CM4 are sufficiently isolated from CM1 and CM3 and, therefore, channel 1 can be assigned to the downstream traffic of CM2 and CM4. If CM1 and/or CM3 transmits at the same time CM2 and/or CM4 receives, the isolation between the IG groups prevents interference from occurring.

Adjacent channel interference (ACI) may also arise in a Full Duplex DOCSIS® cable network with legacy cable modems, because legacy cable modems share the downstream spectrum in the FDX band with FDX-enabled cable modems. Some downstream traffic of legacy cable modems will be adversely affected by the ACI (upstream signal on downstream spectrum) introduced by FDX operation, resulting in up to 5% packet error rate and clamped downstream throughput. Moreover, ACI cannot be mitigated by sounding and IG groups.

Figure 3:
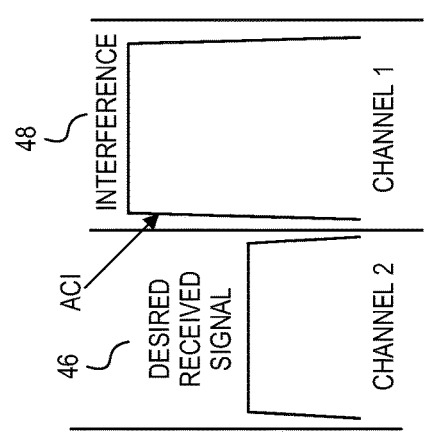
FIG. 3 is an example signal comparison of two channels with adjacent channel interference in a full duplex cable network environment.

ACI occurs when an upstream transmit signal from one of cable modems 21 leaks into the downstream pathway of another one of cable modems 21. More specifically, if a first channel is transmitting a signal at the same time a second channel is receiving a signal, and the channels do not overlap in frequency, then interference on the first channel may adversely affect signal reception on the second channel. FIG. 3 illustrates an example of signals during an ACI. A desired received signal 46 is shown adjacent to adjacent channel interference 48 in channel 2. Unlike CCI, which could completely destroy the DS reception, ACI 48 causes degradation on receiver performance. The performance degradation is mainly due to the receiver RF front-end overload if the interference level is higher than the desired received signal level, or due to receiver automatic gain control (AGC) mis-configuring if the interference is intermittent. If the interference subsides, the AGC may increase gain and optimize receiver range. The next time interference occurs, saturation can occur.

Figure 4:
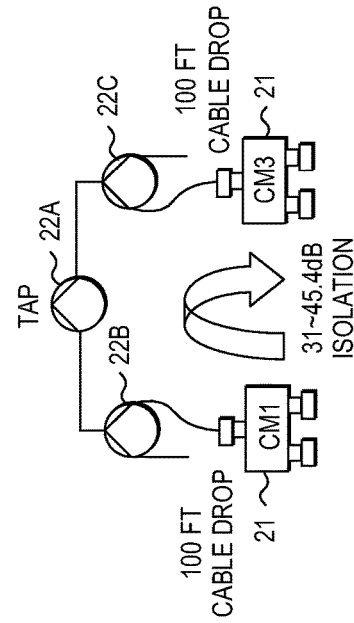
FIG. 4 is a simplified diagram of an example scenario of a tap feeding two cable modems with insufficient isolation in a full duplex cable network environment.

FIG. 4 illustrates an example scenario in which ACI occurs in cable modems of a full duplex cable network. In FIG. 4, a tap 22A is used to feed two cable modems, CM1 and CM3. Because CM1 and CM3 are in close physical proximity (e.g., in the same neighborhood), they are in the same interference group and, therefore, transmitting on the same channel (e.g., channel 1). If the interference on channel 1 is too high, it may detrimentally impact the reception on channel 2. For example, if 100-ft cable drop is used for CM1 and another 100-ft cable drop is used for CM3, this can cause a 2 dB to 5.6 dB loss from 108 MHz to 684 MHz. Thus, the RF isolation between the two cable modems on the same tap will be (2~5.6)*2+23=27 dB~34.2 dB. The maximum output power of a cable modem is 47 dBmV/6 MHz (TCP=65 dBmV with 6 dB uptilt). The ACI experienced by neighboring cable modems will be 20 dBmV/6 MHz~12.8 dBmV/6 MHz (108 MHz~684 MHz), which is well above the nominal downstream received power level (−6~0 dBmV/6 MHz). Furthermore, the port-to-port isolation is only 23 dB. Certain test data has shown that ACI could cause close to 5% packet error rate.

Other testing has shown that certain packet error rates limit throughput due to TCP windowing shrinking. In addition the latency between an RPD and a CM aggravates the issue. For example, if a packet error rate is 0.0001% ($10^{-7}$), 10 Gbps bandwidth at 10 msec round trip time (RTT) can be supported, and 6 Gbps bandwidth at 100 msec RTT can be supported. For a packet error rate of 0.1% ($10^{-3}$), however, the maximum bandwidth is only 80 Mbps at 10 msec RTT, and only 3 Mbps at 100 msec RTT. If a cable modem is supposed to provide 200 Mbps, and if the packet error rate slips to just 0.001% ($10^{-5}$), 200 Mbps cannot be supported across the entire time span of 10 msec to 100 msec RTT because the supported range is 800 Gbps at 10 msec RTT to 130 Mbps at 100 msec RTT. Furthermore, if a golden customer requires support at 1 Gbps, it cannot be supported if any packet error rate is experienced.

Full duplex cable network environments using TCP protocol can also experience the TCP congestion slow start syndrome. Whenever there is a lost packet, the congestion window halves and thus, the throughput also halves. The congestion window increases slowly if no further packet losses are detected. If a new lost packet is detected before the congestion window/throughput reaches the maximum, however, the throughput will be capped. It takes longer to reach the maximum window/throughput with longer delay. Thus, a long latency manifests the adverse impact of TCP lost packets.

In summary, ACI can become problematic for some legacy cable modems in a Full Duplex DOCSIS® cable network, because the legacy cable modems share the downstream spectrum in the FDX band with FDX-enabled cable modems. Some downstream traffic of the legacy cable modems may be adversely affected by the ACI (upstream signal on downstream spectrum) introduced by FDX operation, resulting in up to 5% packet error rate and clamped downstream throughput. One approach to improving tap isolation includes replacing taps in existing cable networks to enable full duplex operation by legacy modems. This approach, however, carries a significant cost. Moreover, ACI affecting legacy cable modems cannot be mitigated by sounding and IG groups. Many legacy DOCSIS 3.0/3.1 cable modems are expected to coexist with FDX cable modems in the FDX band for a long time. Thus, a solution is needed to alleviate ACI issues and ensure normal operation of legacy cable modems.

Embodiments of communication system 10 can resolve such issues (and more) by selectively intercepting, acknowledging, and retransmitting packets of flows associated with cable modems that experience ACI. In particular, downstream packets of flows are monitored for ACI. Monitoring includes detecting packets that are not received by a cable modem (e.g., lost or dropped packets). In an example protocol, such as Transport Control Protocol (TCP), after a packet is transmitted from a CMTS to a cable modem, if an acknowledgement message for the packet is not received from the cable modem before the expiration of a timeout period (e.g., ACK timeout) or if a duplicate acknowledgement message is received from the cable modem for a different packet, it can be assumed that the packet was not received by the cable modem. The cable modem can be determined to be experiencing ACI issues based on comparing a packet error rate (PER) associated with the cable modem to a tag threshold configured for the cable modem. The tag threshold can be based on a number of factors including, but not limited to a service level agreement of the cable modem, a quality of service (QoS) requirement for a particular flow, historical data of the cable modem and/or active flows, traffic types associated with active flows, application type associated with the active flows, and/or a resource usage of a selective proxy. If a cable modem is determined to have issues related to ACI, then the cable modem is tagged as a potential candidate for the selective proxy.

When a cable modem is tagged, packet error rates of each active flow associated with the tagged cable modem can also be evaluated to determine if that flow is affected by ACI and should also be tagged. The packet error rate of a flow can be compared to a tag threshold that is configured for the flow and based on one or more of the factors previously mentioned (e.g., SLA, QoS, historical data, traffic type, application type, resource usage). If a flow is determined to be experiencing ACI based on the comparison of its PER to its tag threshold, then the flow can be tagged and subsequent packets of the flow can be processed by the selective proxy. The selective proxy intercepts a packet of a tagged flow, stores a backup of the packet (e.g., in a buffer), sends an acknowledgement message to the source of the packet, sends the packet to the cable modem, and retransmits the backup packet to the cable modem based on determining that the cable modem did not receive the packet. The stored backup packet is dropped if an acknowledgement message for the packet (or the backup packet if the backup packet was retransmitted after the packet was lost) is received from the cable modem. Additionally, a flow may be de-tagged if its packet error rate satisfies a particular de-tag threshold.

Embodiments described herein have significant real-world advantages. In particular, embodiments described herein can result in significantly less operation costs than an approach to improve tap isolation by replacing existing taps to taps with higher port-to-port isolation. Replacing taps requires deploying service technicians to locate the problem taps. In a typical configuration with three or more taps between a CMTS and a cable modem, the technician has to look at each tap. Such an approach is labor intensive and, therefore, very costly. Furthermore, such an approach is reactive, which may cause customer dissatisfaction. Embodiments described herein can be implemented without having to know where the problems exist. Once implemented, the current embodiments can alleviate ACI issues as they arise, transparent to the customers.

Another advantage of embodiments disclosed herein include the ability of the selective proxy to selectively process packets of flows associated with a cable modem. Flows from each individual cable modem are assessed and whether the flows are proxied depends on the individual link condition, the cable modem's SLA, its packet error rate target, and which interference group it belongs to. Thus, only selected flows affected by ACI are proxied, which is likely to consume fewer resources than proxying every packet of every flow. A further advantage of selectively proxying flows helps prevent the TCP slow start syndrome. By proxying the TCP flows, the source never knows there are lost packets, so its congestion window does not shrink and therefore, the throughput does not shrink.

Turning to the infrastructure of communication system 10, the network topology can include any number of cable modems, customer premises equipment (e.g., connected to cable modems and serving as destination/termination point for downstream signals), servers, switches (including distributed virtual switches), routers, amplifiers, taps, splitters, combiners and other elements and/or nodes inter-connected to form a large and complex network. Cable network 12 and wide area network 5 each represent a series of points or nodes of interconnected communication pathways for receiving and transmitting signals, packets and/or frames of information in communication system 10. A node may be any electronic device, network element, computer, hard disk drive, client, server, peer, service, application, or other device, component, or object capable of sending, receiving, amplifying, splitting, or forwarding signals over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Cable network 12 and wide area network 5 offer communicative interfaces between network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. In a common cable implementation, cable network 12 may offer a hybrid fiber-coaxial (HFC) network that includes a bi-directional hybrid network with both optical fibers and coaxial cables and intermediate devices (e.g., fiber nodes), or a digital fiber-coaxial (DFC) network that includes a bi-directional network with digital fibers and coaxial cables and intermediate devices (e.g., remote phy devices (RPD)). The intermediate devices facilitate receiving, translating, and forwarding signals.

Cable network 12 and wide area network 5 may implement any suitable communication protocols for transmitting and receiving data packets within communication system 10. For example, the architecture of the present disclosure may include a configuration capable of DOCSIS, Transmission Control Protocol/Internet Protocol (TCP/IP), user datagram protocol/IP (UDP/IP), FDD, TDD, communication access technologies (e.g., frequency division multiple access (FDMA), time division multiple access (TDMA), code division multiple access (CDMA), orthogonal frequency division multiple access (OFDMA), spatial division multiple access (SDMA)), and/or other communications for the electronic transmission or reception of signals in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

In some embodiments, a communication link may represent any electronic link supporting a network environment such as, for example, cable, Ethernet, wireless technologies (e.g., IEEE 802.11x), ATM, fiber optics, digital fiber, etc. or any suitable combination thereof. In other embodiments, communication links may represent a remote connection through any appropriate medium (e.g., digital subscriber lines (DSL), coaxial fiber, telephone lines, T1 lines, T3 lines, wireless, satellite, fiber optics, cable, Ethernet, etc. or any combination thereof) and/or through any additional networks such as a wide area networks (e.g., the Internet).

In particular embodiments, CMTS 14 may comprise a hardware appliance with appropriate ports, processors, memory elements, interfaces, and other electrical and electronic components that facilitates forwarding packets between network side interface ports facing wide area network 5, for example, and DOCSIS RF interface ports facing cable network 12. CMTS 14 also facilitates particular functions described herein including providing high speed data services, such as cable Internet or voice over Internet Protocol (e.g., in the form of digital, RF, or other suitable signals) to customer premises equipment (CPE) of cable subscribers via cable modems 21. In various embodiments, CMTS 14 comprises a Universal Broadband Router (uBR) with features that enable it to communicate with a Hybrid Fiber Coaxial (HFC) network (e.g., cable network 12) via a suitable cable modem card, which provides an interface between the uBR protocol control information (PCI) bus and radio frequency (RF) signals on the DOCSIS HFC cable network.

In some embodiments, CMTS 14 may comprise a converged cable access platform (CCAP) core that transmits and receives digital signals in IP protocols, coupled with one or more physical interface (PHY) transceiver(s), such as transceiver 18 that converts the digital IP signals into RF signals, and vice versa. The PHY transceivers, such as transceiver 18, may be co-located with the CCAP core at a common location, or may be located remote from the CCAP core and connected over converged interconnect network (CIN) 15. In some embodiments, CMTS 14 may comprise a single CCAP core and a plurality of PHY transceivers, such as transceiver 18. CMTS 14 is connected (e.g., communicatively coupled, for example, through wired or wireless communication channels) to cable modems 21, transceiver 18, and amplifiers 20 in cable network 12. Amplifiers 20 and other network components may be provisioned in a fiber node or remote PHY device (RPD) that feeds multiple cable modems.

In some embodiments, flow monitor 23, selective proxy 25 and intelligent MAC scheduler 26 may comprise combined or separate hardware, software, firmware, or any suitable combination thereof executing within CMTS 14 to the operations thereof (e.g., ACI mitigation for cable modems 21, spectrum sharing by cable modems 21). In other embodiments, flow monitor 23, selective proxy 25 and intelligent MAC scheduler 26 may comprise combined or separate hardware, software, firmware, or any suitable combination thereof executing outside CMTS 14, for example, in a separate appliance (e.g., TCP proxy server, fiber coaxial unit (FCU) access node, etc.), server, or other network element and coupled to (e.g., connected to, in communication with, etc.) CMTS 14 in cable network 12.

Transceivers 18 may comprise suitable hardware components and interfaces for facilitating the operations described herein. In some embodiments, transceivers 18 may be embedded in or be part of another hardware component, such as a broadband processing engine comprising a motherboard, microprocessors and other hardware components. In some embodiments, transceivers 18 comprise downstream and upstream PHY modules, deployed in a Coaxial Media Converter (CMC) that supports RF functions at the PHY layer. Transceivers 18 may comprise pluggable modules (e.g., small form-factor pluggable (SFP)) that may be plugged into a network element chassis, or embedded modules that attach to cables directly. In addition to optical and electrical interfaces, transceivers 18 include a PHY chip, appropriate digital signal processors (DSPs) and application specific integrated circuits (ASICs) according to particular needs. In various embodiments, the DSPs in transceivers 18 may be adapted (e.g., programmed) to perform appropriate interference cancellation as described herein to enable full duplex communication.

Amplifiers 20 comprise RF amplifiers suitable for use in cable network 12. Amplifiers 20 are typically used at intervals in network 12 to overcome cable attenuation and passive losses of electrical signals caused by various factors (e.g., splitting or tapping the coaxial cable). Amplifiers 20 may include trunk amplifiers, distribution amplifiers, line extenders, house amplifier and any other suitable type of amplifier used in cable networks. According to various embodiments, substantially all amplifiers 20 are configured suitably as described herein to facilitate full duplex communication.

Content server 7 is a node in communication system 10 that can send content (e.g., video content, audio data, Internet data, files, electronic mail, etc.) to customer premises equipment (CPE). The node can include any suitable network element or collection of network elements such as servers or server pools, for example. Numerous other network elements (e.g., routers, switches, gateways, appliances, firewalls, etc.) may facilitate communication between content server 7 and CMTS 14. The content is routed via CMTS 14 and a cable modem that feeds the CPE. A CPE can include, but is not limited to network elements and network endpoints such as, for example, home routers, set-top devices, personal computers, laptops, smart phones, tablets, gaming systems, smart appliances, televisions, etc.

Turning to FIG. 5, FIG. 5 shows a simplified diagram illustrating certain elements of communication system 10, along with additional details. Elements of communication system 10 that are shown in FIG. 5 include content server 7, wide area network 5, CMTS 14, a fiber node/remote PHY device 19, cable network 12, and cable modems 21. CMTS 14 includes mac scheduler 26, full band transceiver 18, flow monitor 23, selective proxy 25, and proxy data 24. Possible details of proxy data 24 are shown in FIG. 5 including tag and de-tag threshold data 32, backup packets buffer 34, and tagged CMs and/or flows lookup table 36.

In operational terms, and in at least one embodiment, MAC scheduler 26 implements a two-dimensional transmission-reception (T-R) coordination scheme among cable modems 21 in cable network 12. According to the T-R coordination scheme, cable modems 21 are categorized into interference groups, such as IGs 30A and 30B, such that no cable modem of any one interference group transmits upstream in a frequency range simultaneously as another cable modem in the same interference group receives downstream in the frequency range, facilitating full duplex communication in cable network 12 across the frequency range. By way of example, cable modems CM1, CM3, and CM5 of IG 30A may be assigned to the same channel (e.g., channel 1) for upstream traffic, and the same, but different channel (e.g., channel 2) for downstream traffic. Cable modems 21 operate in simplex mode, while supporting full band operation for downstream reception and upstream transmission. Note that cable modems 21 in different interference groups may transmit upstream and receive downstream simultaneously in the frequency range. For example, CM2 and CM4 of IG 30B may be assigned to channel 1 for downstream traffic and to channel 2 for upstream traffic, the reverse of the channel assignments in IG 30A. In various embodiments, CMTS 14 receives and transmits network traffic across the entire frequency range, facilitating full duplex communication in cable network 12.

In some embodiments, cable modems 21 are classified into interference groups, such as IGs 30A and 30B, through a ranging process (also referred to as 'sounding'). Ranging can include, but is not limited to, measuring and/or monitoring interference among cable modems 21. In at least some embodiments, interference groups, such as IG 30A and 30B, may not be updated often. Updating interference groups comprises informing cable modems 21 categorized in respective interference groups 30A and 30B as to their membership. Membership of cable modems 21 may change due to various environmental conditions, network load balancing, bandwidth usage by particular cable modems, new cable modems being added to the network, and other factors. In some embodiments, interference groups may be updated when there are changes to Hybrid fiber-coaxial (HFC); in other embodiments, interference groups may be updated after a predetermined time interval (e.g., 24 hours).

Although cable modems can be advantageously grouped into interference groups to prevent co-channel interference, in some scenarios, adjacent channel interference may occur within interference groups. For example, if not enough isolation exists between CM1 and CM3, then upstream traffic of CM3 on channel 1 may leak into downstream traffic of CM1 on channel 2. Selective proxy 25 can work in conjunction with flow monitor 23 to alleviate ACI issues on downstream traffic of legacy cable modems in full duplex cable networks. In at least one embodiment, selective proxy 25 is configured for transmission control protocol (TCP) connections between content server 7 and cable modems 21. For ease of illustration, specific references to TCP and its particular specific characteristics may be referenced herein with regard to flow monitor 23, selective proxy 25, and other elements of communication system 10. It should be noted, however, that the broad concepts of flow monitor 23, selective proxy 25, and other elements of communication system 10 could be applied to other suitable protocols and communication technologies based on particular needs and implementations.

Flow monitor 23 detects which cable modems, and which flows associated with those cable modems, experience ACI on their downstream traffic. Flow monitor 23 can be implemented using any suitable network elements including, for example, a router or gateway. Detection includes monitoring flows of the cable modems to determine whether packets of flows have been received by the intended cable modems. In at least one embodiment network flows can be monitored by snooping TCP for acknowledgement messages (e.g., TCP ACK messages) sent from cable modems to the source (e.g., content server 7) that indicate a packet was received by the cable modem. In one example of a packet transmitted to a cable modem, if flow monitor 23 does not receive an ACK message from the cable modem within a timeout period, this indicates that either the packet or the ACK message was dropped. In another example of a packet transmitted to a cable modem, if flow monitor 23 receives a duplicate ACK message for a different packet, this can also indicate the packet was dropped. A cable modem sends a duplicate acknowledgement message when it receives an out of order packet. An out of order packet has a sequence number that skips one or more sequence numbers from the last packet received by the cable modem. The cable modem then resends the last ACK message to indicate the expected packet (with a next sequence number) was not received.

Flow monitor 23 can calculate packet error rates based on the dropped packets for each cable modem and for each flow associated with the cable modems. Packet error rate is a ratio (e.g., in percent) of the number of packets dropped (or otherwise not successfully received by a cable modem) to the number of packets sent to the cable modem over a period of time. PER can be calculated per cable modem and per each flow associated with the cable modem. In at least one embodiment, calculating PER of a cable modem or flow can be implemented using a moving average scheme, or any other suitable technique.

A tag threshold for a cable modem may be used to determine whether to tag the cable modem as a potential candidate for proxying one or more of its flows via selective proxy 25. Additionally, a flow associated with a tagged cable modem may also be tagged based on a tag threshold for the flow. Tag thresholds can be configured specifically for particular cable modems and for particular flows associated with the cable modems. Example tag thresholds per flow could include, but are not limited to, 0.001% or 0.01%.

A tag threshold can be a function of one or more factors. Factors include, but are not limited to one or more of: quality of service (QoS) required by a flow, service level agreement (SLA) of the cable modem, traffic type, application type, and historical data. A service level agreement (SLA) can be associated with one or more cable modems and may be used to set a tag threshold for packet error rates of those cable modems. For example, an SLA may require 0.001% PER for a 'Gold' user, and 0.01% PER for a 'Brown' user. A tag threshold set based on an SLA of a particular cable modem may be compared to a PER calculated for that cable modem to determine whether to tag the cable modem.

Another factor, historical data, may also be used to set a tag threshold for a cable modem. For example, if a cable modem was recently tagged (e.g., within 2 hours), the cable modem can be tagged once a single ACK message timeout or duplicate ACK message is detected. In this scenario, a de-tag threshold, which can be used to de-tag a cable modem and/or a flow, may be configured to allow the cable modem to be de-tagged only if no ACK message timeouts or duplicate ACK messages are detected for a particular period of time (e.g., 30 minutes). If the cable modem has never been tagged, however, then a tag threshold may be set so that the cable modem will not be tagged until a higher number (e.g., ten) of ACK message timeouts and/or duplicate ACK messages have been detected.

Certain other factors may be used to set tag thresholds for comparison to packet error rates of flows. QoS may differ according to types of flows. For example, QoS may require 0% PER for control and/or signaling messages, 0.001% PER for video flows, and 0.01% PER for voice flows. In some cases, a tag threshold may be based on an application type (e.g., video, voice, file download, etc.). Similarly, a tag threshold may be based on a traffic type (e.g., control messages, data messages). In some cases, the most restrictive tag threshold (e.g., low tag threshold such as 0% or 0.00001%) of a relevant threshold factor overrides other factors relevant to that flow. For example, if a flow does not have a QoS requirement or if the application type or traffic type requires a lower tag threshold than the QoS requirement for a particular flow, then the tag threshold may be based on the application or traffic type rather than the QoS requirement.

Another factor that may be considered when setting and/or applying a tag threshold is resource usage of selective proxy 25. In some implementations, a flow that should be tagged based on having a PER that satisfies the flow's tag threshold, may not be tagged if the resource utilization (e.g., central processing unit (CPU) utilization, memory usage, etc.) of selective proxy 25 meets or exceeds a resource utilization limit. If such resources subsequently become available, however, then untagged flows that previously met the tagging threshold requirement may be tagged to be proxied by selective proxy 25. It should be noted that proper tag threshold settings can help limit the number of flows to be proxied. Thus, resources used to proxy the flows can be at least partially managed by tag thresholds and evaluations of resource utilization to prevent overburdening the selective proxy server.

As used herein, 'tagging' a cable modem is intended to mean providing an indication that the cable modem is a candidate for proxying one or more of its downstream flows. In at least one embodiment, the indication can be in the form of recording an identification of the tagged cable modem in a lookup table, such as tagged CMs/flows lookup table 36. The identification could be any suitable information to uniquely identify the cable modem including, but not limited to a media access control (MAC) address, or network information such as a 5-tuple in TCP/IP (i.e., source IP address, source port, destination IP address, destination port, protocol). Also, as used herein, 'tagging' a flow is intended to mean providing an indication that the downstream traffic of the flow is to be proxied by selective proxy server 25. The indication can be in the form of recording an identification of the tagged flow in a lookup table, which may or may not be combined with the lookup table for tagged cable modems. The identification could include any suitable information to uniquely identify the flow including, but not limited to network information such as a 5-tuple or any other identifying information available in the flow.

When a cable modem is tagged, current flows associated with the cable modem may or may not be tagged. Current flows (e.g., video, voice, file transfer, email, etc.) propagating to the cable modem can be identified and classified, according to their traffic types, to be evaluated for ACI or not to be evaluated for ACI. For example, any flows carrying control and/or signaling messages may be classified as flows to always be evaluated for ACI. In another example, certain flows having slower throughput (e.g., voice or other flows of 1-2 Mbps throughput) may be classified as flows that are not to be evaluated for ACI. If such a flow experiences ACI and its window shrinks, it may still be supported at the slower throughput. In some implementations, the slower flows do not have an associated tag threshold and, therefore, these flows are not tagged because their packet error rates are not evaluated. Other flows that require a faster throughput (e.g., 200 Mbps to 300 Mbps) may be classified to be evaluated for ACI.

By way of example, consider a flow of a cable modem that was tagged based on a tag threshold configured using an SLA of the cable modem. Further consider that the flow is identified as having a traffic type that could be significantly affected by ACI. Consequently, the flow is classified as a flow to be evaluated for ACI. In one example scenario, if the flow requires a large pipe (e.g., 200 Mbps to 300 Mbps), then it may be evaluated for ACI in order to minimize packet drops and maintain the required throughput. Packet error rates of the identified flow can be compared to its specific tag threshold to determine whether the flow should be tagged. If a PER of the flow satisfies the tag threshold for that flow (e.g., meets/exceeds the tag threshold), then the flow is tagged. If the PER of the flow does not satisfy the tag threshold for the flow (e.g., is less than the tag threshold), then the flow is not immediately tagged.

In some scenarios, a cable modem may be tagged based on one of its flows being tagged. For example, for some cable modems, packet error rates may be calculated only per flow, and not per cable modem. Thus, when a PER of a flow satisfies a tag threshold of the flow, if the cable modem associated with that flow has not already been tagged, it may be tagged along with the flow.

Once a flow has been tagged, selective proxy 25 is activated to perform proxy functions for downstream packets of the tagged flow. Selective proxy 25 can be implemented using any suitable network elements including, for example, a server. First, downstream packets of the tagged flow are intercepted by selective proxy 25. Second, the intercepted packets are stored until the selective proxy 25 receives a notification from the destination cable modem that the packet was received by the cable modem. In at least one embodiment, flow monitor 23 routes downstream packets of the tagged flow to selective proxy 23. When flow monitor receives the packet, flow monitor 23 can determine that the packet belongs to the tagged flow by identifying the flow from information in the packet (e.g., MAC address, 5-tuple network information). Flow monitor 23 can query a lookup table (e.g., 36) that identifies tagged CMs and flows to determine whether the identified flow is tagged. Based on determining the identified flow is tagged, flow monitor 23 can forward the packet to selective proxy 25.

A packet received by selective proxy 25 can be forwarded to the destination cable modem. Selective proxy 25 can save a backup packet (e.g., in backup packets buffer 34) and send an acknowledgement message to the source of the packet (e.g., content server 7). Thus, upon receiving the acknowledgement message, the source will believe the packet has been received by the destination cable modem. Therefore, the source does not retransmit the backup packet. Selective proxy 25 can monitor messages received from the destination cable modem to determine whether an ACK timeout occurs or a duplicate ACK message is received. If either an ACK message timeout occurs or a duplicate ACK message is received, selective proxy 25 can retransmit the backup packet to the cable modem. Otherwise, if an ACK message is received, selective proxy server 25 can drop the backup packet (e.g., from backup packets buffer 34).

When a flow associated with a cable modem is tagged and selective proxy server 25 is performing proxy functions for the downstream network traffic of the flow, monitoring the cable modem messages continues. First, other flows of the cable modem that have not previously been affected by ACI, along with new flows, are monitored in order to detect any ACI issues that might subsequently arise. Second, a flow that has been affected by ACI (and is tagged) continues to be monitored while being proxied in order to determine whether the ACI issue affecting the flow has been sufficiently mitigated so that the flow can be de-tagged.

A de-tag threshold may be used to determine whether to de-tag a tagged flow. De-tag thresholds can be configured specifically for particular flows. If a PER of the flow drops below a de-tag threshold for a period of time, the flow and possibly the cable modem can be de-tagged. When a flow is de-tagged, this indicates that ACI is no longer detected in the flow. As used herein 'de-tagging' is intended to mean removing the indication that downstream traffic of the flow is to be proxied by selective proxy server 25. Accordingly, selective proxy server 25 no longer performs proxy functions on a flow after it is de-tagged. In at least one embodiment, de-tagging can be accomplished by removing the identification of the tagged flow from tagged CMs/flows lookup table 36.

Similar to a tag threshold, a de-tag threshold can be a function of one or more factors including, but not necessarily limited to: QoS, SLA, traffic type, application type, historical data, and/or resource availability of selective proxy server 23. In at least one embodiment, a de-tag threshold for a flow is lower than a tag threshold. In this scenario, the packet error rate needed to tag an untagged flow is higher than the packet error rate needed to de-tag a tagged flow. Such a configuration helps minimize hysteresis, where a flow bounces between being tagged and untagged repeatedly. In addition, requiring a packet error rate to satisfy a de-tag threshold for a period of time may also help with hysteresis if the period of time is sufficient to capture flows in which ACI has ended (e.g., neighbor stopped using device causing ACI) rather than just temporarily subsided (e.g., neighbor took a short break from using device causing ACI).

In at least one embodiment, ACI detection, tagging and de-tagging is coordinated with interference group sounding procedures. With each IG cycle, channel assignments and/or interference groups may change. Therefore, the adjacent channel interferences may change in response to the channel and/or IG changes. Thus, tagging (and de-tagging) of cable modems and flows may need to be refreshed (e.g., de-tagged, lost packet counts cleared/set to zero, total packets transmitted counts cleared/set to zero, historical data of flows set to indicate no ACI has been detected, etc.) with each round of IG sounding, so that monitoring, tagging, and eventually de-tagging can start over.

Figure 6:
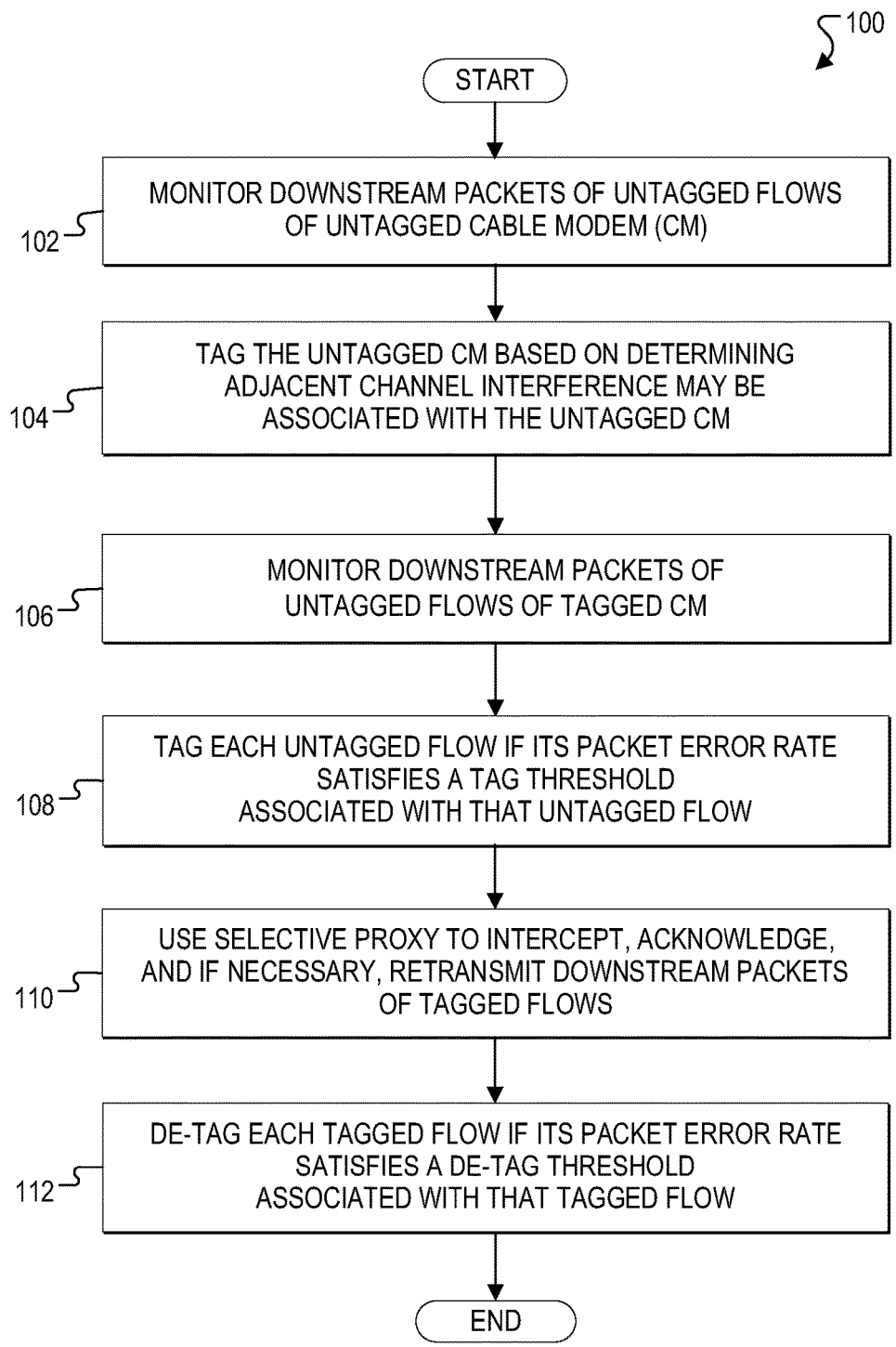
FIG. 6 is a simplified flowchart of example operations that may be associated with embodiments of the communication system.

Turning to FIG. 6, a flowchart illustrating high level example operations 100 associated with alleviating adjacent channel interference in cable modems of a full duplex cable network. One or more sets of operations may correspond to the activities of FIG. 6. In an embodiment, flow monitor 23 and selective proxy 25 of CMTS 14 may perform one or more operations of the sets of operations. This flow monitor and selective proxy may comprise means, including for example, one or more processors (e.g., 27) and one or more memory elements (e.g., 28), for performing such operations. Operations 100 may be performed for any or all cable modems in a cable network, which may include one or more cable modems in multiple interference groups.

At 102, downstream packets of untagged flows of an untagged cable modem are monitored. For each downstream packet forwarded from CMTS 14 to a cable modem, monitoring can include determining whether a timeout period expired before receiving an acknowledgement message (e.g., ACK message) from the untagged cable modem for the packet or whether a duplicate acknowledgement message was received from the untagged cable modem for a different packet. Both events could indicate that the downstream packet was never received by the cable modem.

At 104, the untagged cable modem is tagged based on determining adjacent channel interference may be associated with the untagged cable modem. A packet error rate can be calculated for a period of time for the untagged cable modem and compared to a tag threshold associated with the cable modem. Depending on the particular tag threshold configured for the cable modem, its PER could be calculated across all flows or across one or more individual flows. If the packet error rate satisfies the tag threshold, then the cable modem is tagged to indicate it is a candidate for the selective proxy to process downstream packets of one or more flows associated with the tagged cable modem. In at least one embodiment, a cable modem's tag threshold can be configured so that the cable modem's PER satisfies the tag threshold if it exceeds the tag threshold. In other embodiments, the cable modem's tag threshold can be configured so that the cable modem's PER satisfies the tag threshold if it meets or exceeds the tag threshold. It should be apparent that any other suitable comparison or technique may be utilized in embodiments described herein to determine whether a PER of a cable modem satisfies a tag threshold for that cable modem.

When the cable modem is tagged, evaluations of packet error rates of flows being monitored in 102, may also be evaluated to determine whether any of the current flows should be tagged. Whether or not any flows are tagged at the time the cable modem is tagged, monitoring untagged flows continues at 106. At 108, each untagged flow is tagged if the untagged flow has a packet error rate that satisfies a tag threshold associated with that untagged flow. In at least one embodiment, a flow's tag threshold can be configured so that the flow's PER satisfies the tag threshold if it exceeds the tag threshold. In other embodiments, the flow's tag threshold can be configured so that the flow's PER satisfies the tag threshold if it meets or exceeds the tag threshold. It should be apparent that any other suitable comparison or technique may be utilized in embodiments described herein to determine whether a PER of a flow satisfies a tag threshold for that flow.

At 110, the selective proxy is used to intercept, acknowledge, and if necessary, retransmit downstream packets of tagged flows to the appropriate cable modems. At 112, each tagged flow is de-tagged (i.e., indication of tagging is removed) if its packet error rate satisfies a de-tag threshold associated with that tagged flow. When a flow is tagged, the downstream packets of the tagged flow continue to be monitored. In at least one embodiment, a flow's de-tag threshold can be configured so that the flow's PER satisfies the de-tag threshold if it is less than the de-tag threshold. In other embodiments, the flow's de-tag threshold can be configured so that the flow's PER satisfies the de-tag threshold if it is equal to or less than the de-tag threshold. It should be apparent that any other suitable comparison or technique may be utilized in embodiments described herein to determine whether a PER satisfies a de-tag threshold. Also, a time requirement may also be imposed on the comparison so that a flow is not de-tagged unless it satisfies the de-tag threshold for a period of time.

Figure 7A:
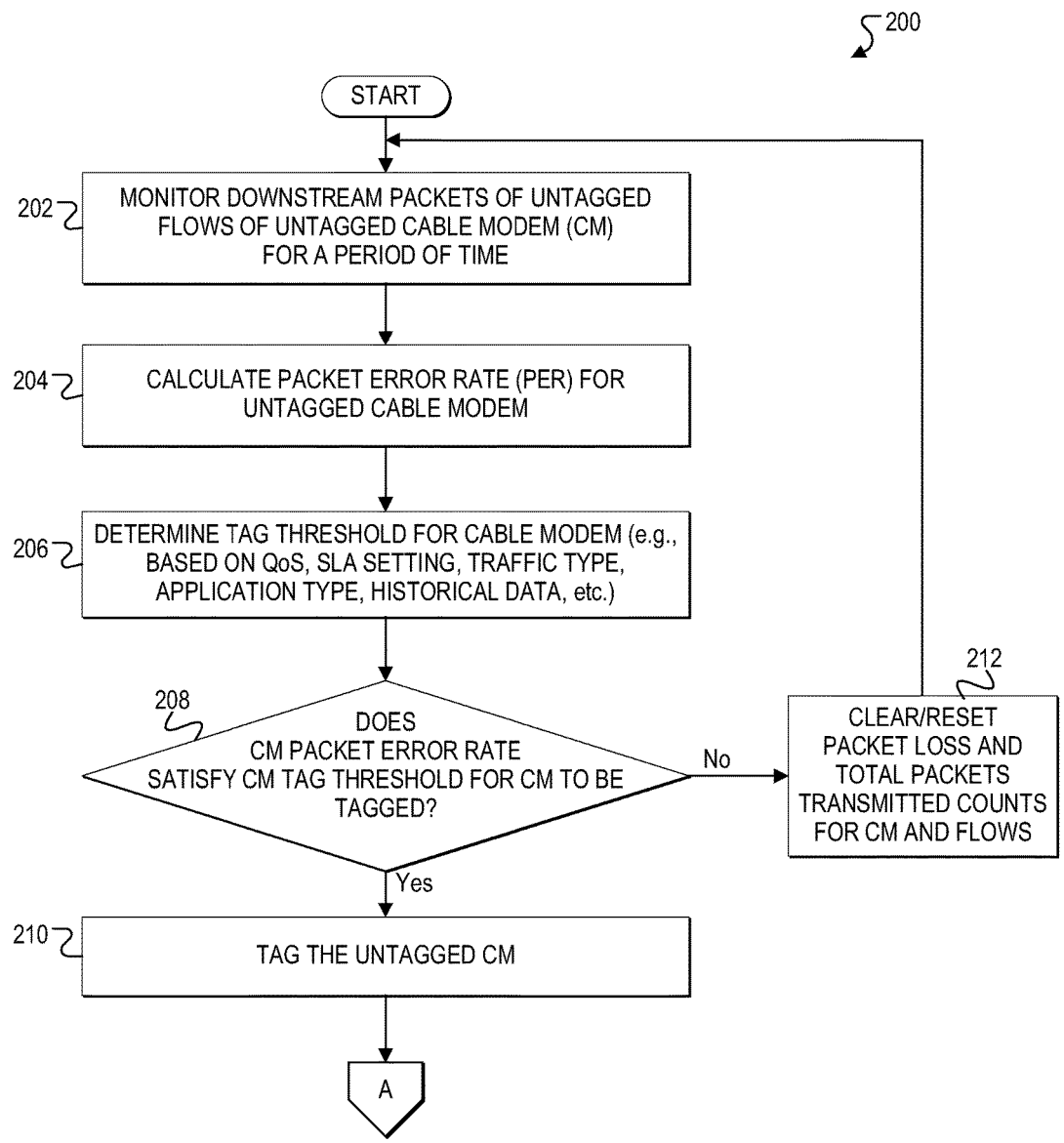
FIGS. 7A-7B are simplified flowcharts of example operations that may be associated with embodiments of the communication system.
Figure 7B:
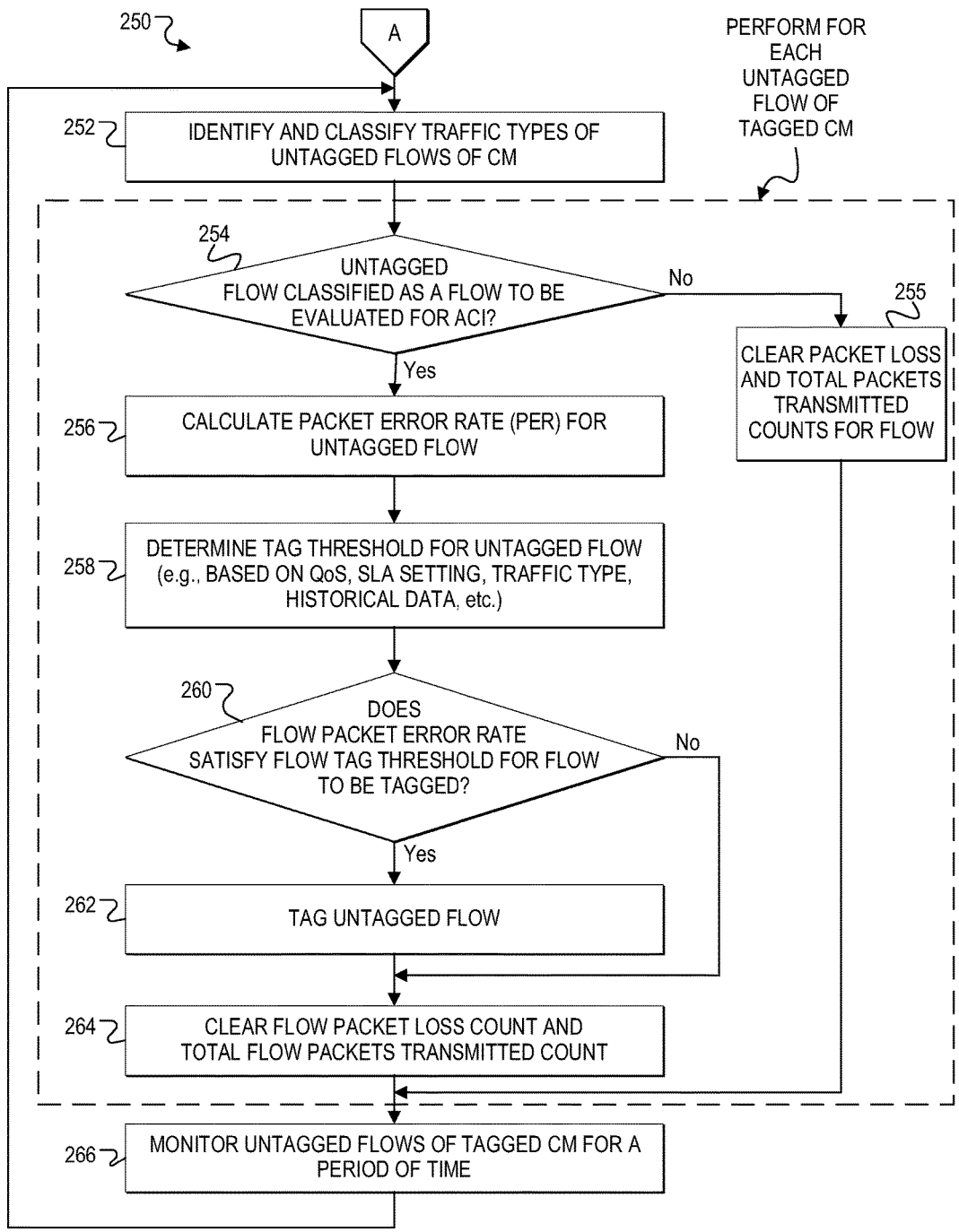

Turning to FIGS. 7A-7B, flowcharts illustrate example operations 200 and 250 associated with monitoring packet loss in cable modems and determining whether the packet losses indicate adjacent channel interference. Operations 200 and 250 provide additional possible details associated with operations of FIG. 6. One or more sets of operations may correspond to the activities of FIGS. 7A-7B. In an embodiment, flow monitor 23 may perform one or more operations of the sets of operations. This flow monitor may comprise means, including for example, one or more processors (e.g., 27) and one or more memory elements (e.g., 28), for performing such operations. Operations 200 and 250 may be performed for each cable modem in a cable network.

At 202, downstream packets of untagged flows of an untagged cable modem are monitored. For example, after a packet is sent from the CMTS to the untagged cable modem, messages from the cable modem are monitored to determine whether an acknowledgement message is received indicating the cable modem received the packet. If an acknowledgment message is not received before a timeout period expires, it is assumed that the packet was not received by the cable modem. Also, if a duplicate acknowledgment message is received from the cable modem for another packet, then it is assumed the packet was not received by the cable modem.

Typically, a packet error rate (PER) is determined over a period of time during which packet losses are monitored. Accordingly, after monitoring the downstream packets of the untagged cable modem for the period of time, at 204, the packet error rate is calculated for the cable modem. In at least one embodiment, a cable modem's PER can be calculated as the ratio, in percent, of the number of packets not received by the cable modem (e.g., number of ACK timeouts or duplicate ACK messages detected) during the period of time to the total number of packets actually sent to the cable modem during the period of time.

In at least one embodiment, the cable modem PER can be calculated across all active flows associated with the cable modem during the period of time. For example, the PER calculation could be the number of ACK timeouts or duplicate ACK messages received for packets across all active flows associated with the cable modem to the total number of packets sent to the cable modem. Thus, while the flows are being monitored, appropriate counts across all active flows and/or for each individual flow may be updated. For example, a total CM packets transmitted count may be updated as each packet is sent to the cable modem, regardless of the flow. Also, an appropriate CM packet loss count may be updated each time a determination is made that a packet was not received by the cable modem, regardless of the flow. Alternatively, or in addition, a total flow packets transmitted count may be updated for a flow each time a packet of that flow is sent to the cable modem. A flow packet loss flow count may be updated each time a determination is made that a packet of that flow was not received by the cable modem.

At 206, a tag threshold for the cable modem can be determined. In one example, a cable modem's tag threshold may be configured a priori based on factors that include, but are not limited to one or more of QoS, SLA settings, traffic type, application type, and/or historical data. The tag threshold for the cable modem may be determined by accessing a lookup table or other storage structure (e.g., tag/de-tag threshold data 32) to retrieve the appropriate tag threshold configured for the cable modem.

In at least one other embodiment, some tag thresholds may be configured dynamically. For example, when historical data is recorded and indicates a particular set of events, then the cable modem's tag threshold may be dynamically changed. To illustrate this example, if a cable modem has been tagged (and then de-tagged) within 2 hours, then the threshold may be decreased so that a lower threshold (e.g., a single ACK timeout or a single duplicate ACK message) causes the cable modem to be tagged again.

At 208, a dynamic determination is made as to whether the CM's packet error rate satisfies the CM's tag threshold for the CM to be tagged. If the CM's packet error rate does not satisfy the CM's tag threshold, then at 212, certain counts can be cleared or reset. For example, a CM packet loss count and a total CM packets transmitted count, which may be used to calculate the packet error rate over a first period of time for that particular cable modem, may set to zero or may be reset to enable a new packet error rate for the CM to be calculated over a second, overlapping period of time that has not yet ended. If counts for packet losses and total packets transmitted are kept for individual flows (e.g., flow packet loss counts, total flow packets transmitted counts) while the untagged cable modem is being monitored at 202, then those counts may be cleared or reset at 212, too. However, in some embodiments, the counts for packet losses per individual flow and for total packets transmitted per individual flow may not be maintained until the cable modem is tagged at 210.

If the CM's packet error rate satisfies the CM's tag threshold, as determined as 208, then at 210, the untagged cable modem is tagged. Tagging the cable modem includes providing an indication that the cable modem is a candidate for proxying one or more of its downstream flows. In at least one embodiment, the indication can be in the form of recording an identification of the tagged cable modem in a lookup table, such as tagged CMs/flows lookup table 36.

Once the cable modem is tagged, then operations 250 in FIG. 7B may be performed. At 252, the type or types of network traffic (e.g., video, gaming, voice, files, email, etc.) of its untagged flows can be identified and classified. A flow's type of network traffic can be used to determine whether an evaluation of adjacent channel interference in the flow is desired and/or needed. For example, a flow with slower throughput requirements (e.g., 1-2 Mbps) may be classified as a flow that is not to be evaluated for ACI, but a flow with higher throughput requirements (e.g., 200+ Mbps) may be classified as a flow to be evaluated for ACI.

Operations 254-264 may be performed for each untagged flow that has been identified and classified. For ease of reference, operations 254-264 will be described with reference to a single untagged flow of the cable modem. At 254, a determination is made as to whether the untagged flow is classified as a flow to be evaluated for ACI. If the untagged flow is classified as a flow that is not to be evaluated for ACI (e.g., the flow requires a throughput of only 1-2 Mbps), then at 255, the counts of packet losses and total packets transmitted for that flow can be cleared or reset, as previously described.

If the determination is made at 254 that the untagged flow is classified as a flow to be evaluated for ACI (e.g., the flow requires a throughput of at least 300 Mbps, the flow contains control/signaling messages), then a packet error rate (PER) is calculated for the untagged flow. Generally, a packet error rate can be determined over a period of time during which packet losses are monitored for a flow. In some embodiments, a packet loss count and total packet transmitted count for a flow are not updated while packet losses of an untagged cable modem are being monitored at 202. In such embodiments, after a cable modem is tagged at 210, untagged flows of the cable modem are monitored over a period of time for packet losses of individual flows of the tagged cable modem. In other embodiments, a packet loss count and total packet transmitted count for untagged flows of an untagged cable modem are maintained and updated while packet losses of the untagged cable modem are being monitored at 202.

At 256, the packet error rate of the untagged flow is calculated. In at least one embodiment, the flow's PER can be calculated as the ratio, in percent, of the number of packets of that are not received by the cable modem during the relevant period of time to the total number of packets of the flow that are sent to the cable modem during the relevant period of time. For example, the flow PER calculation could be the number of ACK timeouts or duplicate ACK messages detected for packets of the flow to the total number of packets of that flow that are sent to the cable modem. Thus, while the flows are being monitored, total flow packets transmitted counts may be updated per flow as each packet is sent and flow packet loss counts may be updated per flow each time a determination is made that a packet of a particular flow was not received by the cable modem.

At 258, a tag threshold for the flow can be determined. In one example, a flow's tag threshold may be configured a priori based on factors that include, but are not limited to one or more of QoS, SLA settings, traffic type, application type, and/or historical data. The tag threshold for the flow may be determined by accessing a lookup table or other storage structure (e.g., tag/de-tag threshold data 32) to retrieve the appropriate tag threshold configured for the flow or the class of flows associated with the flow (e.g., all video flows from a particular provider configured with the same tag threshold).

In at least one other embodiment, some tag thresholds for flows may be configured dynamically. For example, when historical data is recorded and indicates a particular set of events, then the flow's tag threshold may be dynamically changed. To illustrate this example, if a particular flow has been tagged (and then de-tagged) within 1 hour, then the threshold may be decreased so that a lower threshold (e.g., a single ACK timeout or a single duplicate ACK message) causes the flow to be tagged again.

At 260, a dynamic determination is made as to whether the flow's packet error rate satisfies the flow's tag threshold for the flow to be tagged. If the flow's packet error rate does not satisfy the flow's tag threshold, then at 264, certain counts can be cleared or reset. For example, a flow packet loss count and a total flow packets transmitted count, which may be used to calculate the packet error rate over a first period of time for that particular flow, may set to zero or may be reset to enable a new packet error rate for the flow to be calculated over a second, overlapping period of time that has not yet ended.

If the flow's packet error rate satisfies the flow's tag threshold, as determined as 260, then at 262, the untagged flow is tagged. Tagging the flow includes providing an indication that the selective proxy is to perform proxy functions on the flow. In at least one embodiment, the indication can be in the form of recording an identification of the tagged flow in a lookup table, such as tagged CMs/flows lookup table 36. At 264, a flow packet loss count and a total flow packets transmitted count, which may be used to calculate the packet error rate for that particular flow, are cleared or reset, as previously described.

At 266, untagged flows of the tagged cable modem continue to be monitored for packet losses over a next period of time. In one embodiment, the next period of time overlaps with the prior period of time. In another embodiment, the next period of time is consecutive to the prior period of time. Once the next period of time ends, operations may start over at 252 where the type or types of network traffic of the untagged flows, which were monitored at 266, are identified and classified. Each untagged flow that was monitored during the next time period at 266 may then be evaluated in operations 254-264.

In at least some embodiments, certain circumstances can cause a cable modem to be de-tagged. Generally, de-tagging a cable modem occurs when tagging of the cable modem is revoked (e.g., the indication of tagging for a cable modem is removed from tagged CMs/flows lookup table 36). In a real-world example, a cable modem that causes ACI for a neighboring cable modem (which is tagged) may go offline when its users stop using their equipment (e.g., stop streaming movies, stop surfing the Internet, etc.). In this case, ACI stops affecting the neighboring cable modem. In such a scenario, the tagged cable modem may be de-tagged after a maximum tag time during which all flows associated with the cable modem remain untagged. In another example, the cable modem may be de-tagged if all of its flows are untagged and if the packet error rate of the cable modem satisfies a suitable de-tag threshold for the cable modem. De-tag thresholds, which can be applied to both cable modems and flows, are further described herein with reference to de-tagging flows in FIG. 9.

Figure 8:
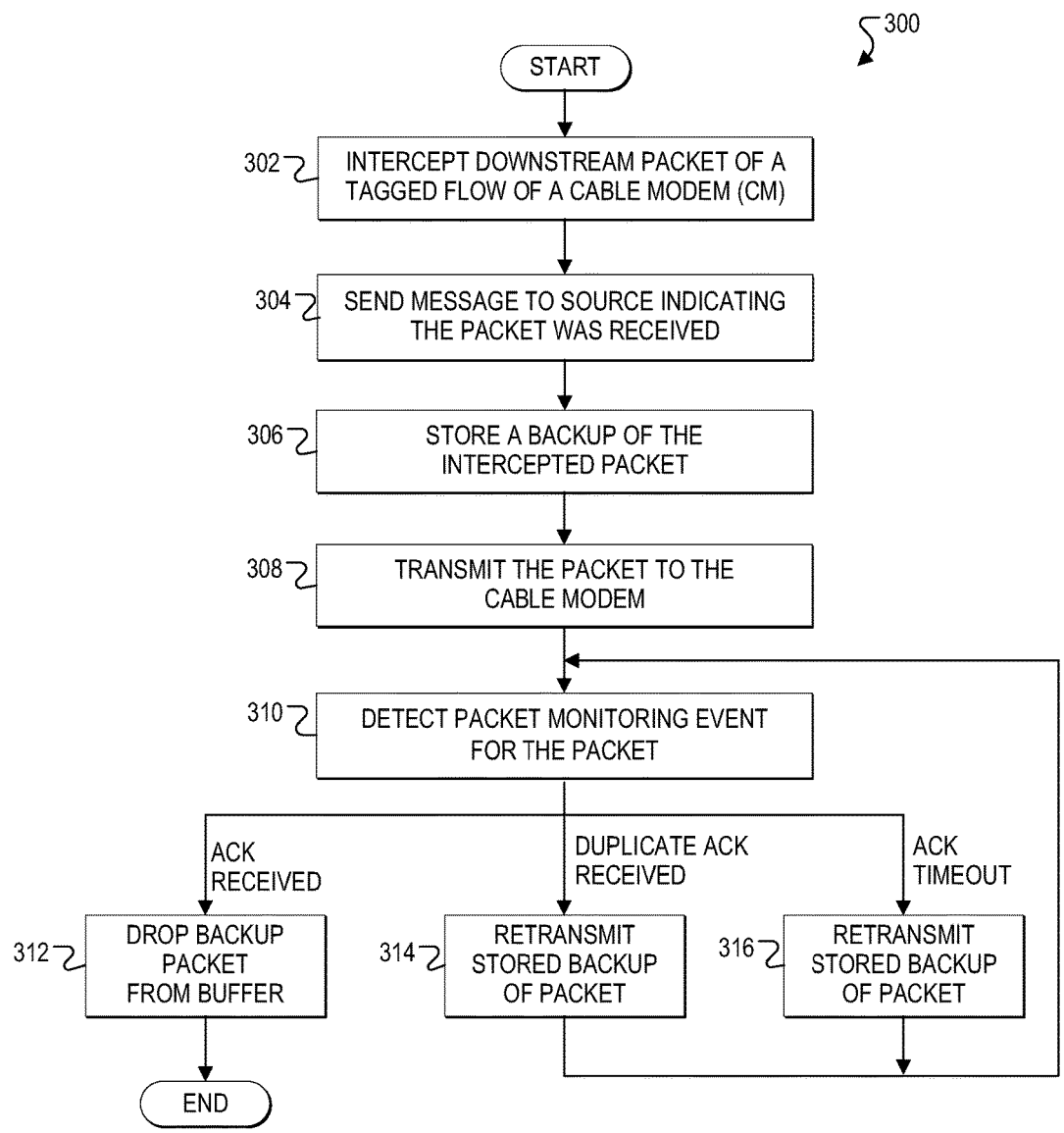
FIG. 8 is a simplified flowchart of example operations that may be associated with embodiments of the communication system.

In FIG. 8, a flowchart illustrates example operations 300 associated with performing selective proxy functions on tagged flows that have been identified as experiencing adjacent channel interference. One or more sets of operations may correspond to the activities of FIG. 8. In an embodiment, selective proxy 25 may perform one or more operations of the sets of operations. This selective proxy may comprise means, including for example, one or more processors (e.g., 27) and one or more memory elements (e.g., 28), for performing such operations. In at least one embodiment, operations 300 may be performed for each packet of each tagged flow.

At 302, a downstream packet of a tagged flow is intercepted by selective proxy 25. In one example, flow monitor 26 may receive the packet, determine that the packet is part of a tagged flow, and forward the packet to selective proxy 25. At 304, the selective proxy sends a message to the source of the packet (e.g., content server 7) indicating the packet was received by the cable modem. In an embodiment using TCP, the message may be an ACK message.

At 306, a backup of the intercepted packet can be stored. Any suitable types of storage (e.g., buffer, cache, etc.) and forms of storage may be used. In one example, backups of packets can be stored in backup packets buffer 34. At 308, the packet is transmitted to the cable modem. At 310, a packet monitoring event is detected for the packet.

In at least one embodiment, the packet monitoring event can include one of three events: (1) an acknowledgement message is received from the cable modem indicating that the packet was received by the cable modem, (2) a timeout period expires without the selective proxy receiving an acknowledgement message for the packet from the cable modem, or (3) a duplicate acknowledgement message for a different packet is received from the cable modem indicating that the cable modem never received the packet. As previously described herein, in the TCP/IP protocol, acknowledgement messages are referred to as 'ACK messages.'

If an acknowledgment message for the packet is received from the cable modem, then at 312, the backup packet is dropped from the buffer (or other storage being used). In this scenario, the proxy functions related to that packet can end. If a timeout period expires, then at 316, the stored backup of the packet (e.g., in the buffer) is retransmitted to the cable modem. Similarly, if a duplicate acknowledgement message is received from the cable modem, then at 314, the stored backup of the packet (e.g., in the buffer) is retransmitted to the cable modem. Retransmissions from the selective proxy in the CMTS are faster than retransmissions from the source of the flow. When the backup of the packet is retransmitted, a copy of the backup remains in the storage and processing continues until the next packet monitoring event for that packet is detected at 310.

Figure 9:
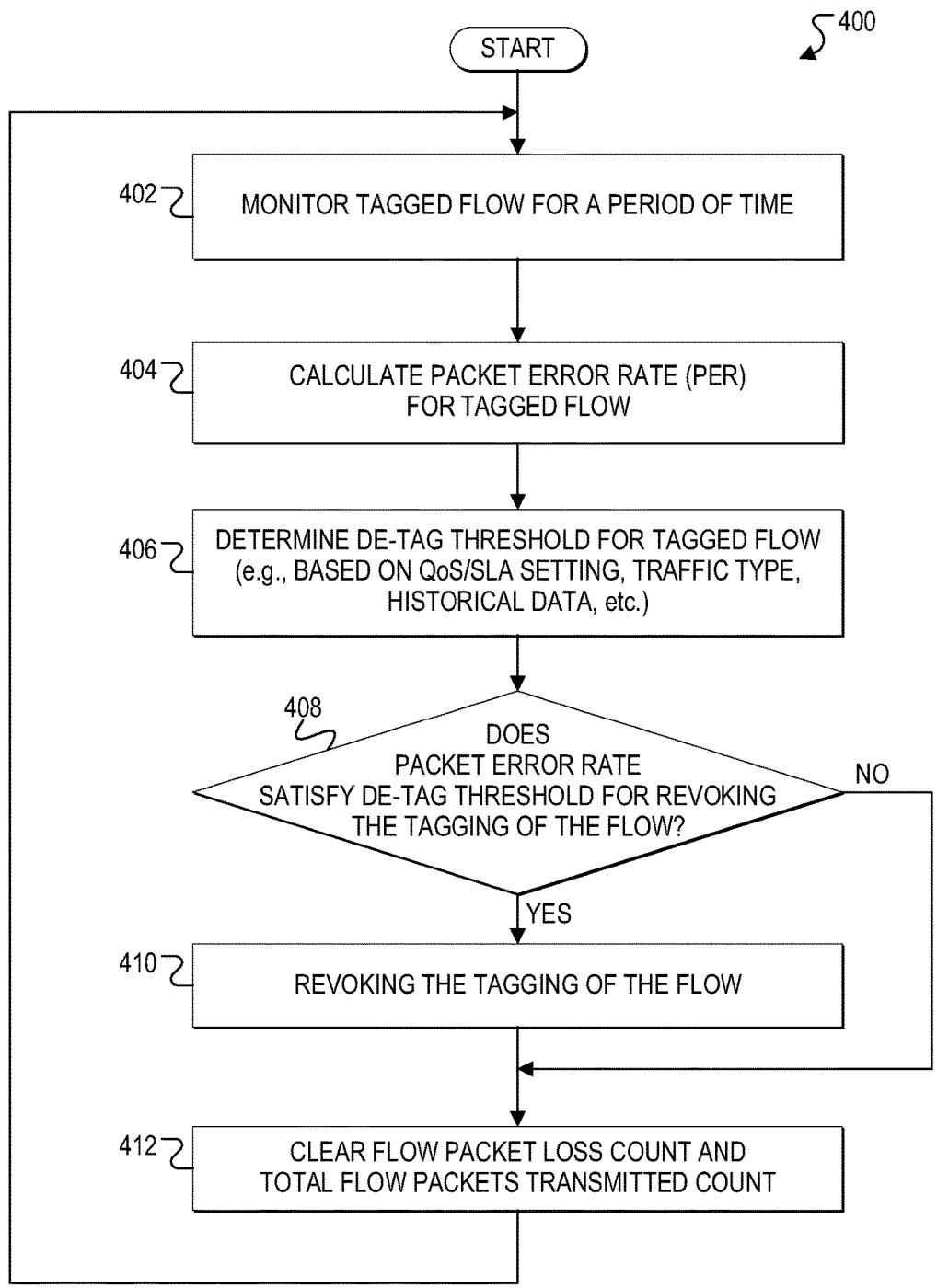
FIG. 9 is a simplified flowchart of example operations that may be associated with embodiments of the communication system.

In FIG. 9, a flowchart illustrates example operations 400 associated with monitoring packet loss in a tagged flow and determining whether adjacent channel interference has been sufficiently alleviated to de-tag the flow. One or more sets of operations may correspond to the activities of FIG. 9. In an embodiment, flow monitor 23 may perform one or more operations of the sets of operations. This flow monitor may comprise means, including for example, one or more processors (e.g., 27) and one or more memory elements (e.g., 28), for performing such operations. In at least one embodiment, operations 400 of FIG. 9 may be performed for each tagged flow of each cable modem. In other implementations, operations of FIG. 9 may be performed by selective proxy 25 as part of processing each packet of tagged flows.

At 402, a tagged flow of a tagged cable modem is monitored for a period of time. For example, after a packet is sent from the CMTS to the tagged cable modem, messages from the cable modem are monitored to determine whether an acknowledgement message is received indicating the cable modem received the packet. If an acknowledgment message is not received in during a timeout period, then it is assumed that the packet was not received by the cable modem. Alternatively, if a duplicate acknowledgment message is received from the cable modem for another packet, then it is assumed the packet was not received by the cable modem. If an acknowledgement message is received, then it is not forwarded to the source of the packet (e.g., content server 7) because an acknowledgement message for the packet has already been provided to the source from the selective proxy at 304.

During the monitoring, counts of the flow packet loss and the total flow packets transmitted are maintained and updated. Once the monitoring period of time has ended, at 404, the packet error rate of the tagged flow is calculated, as previously described herein.

At 406, a de-tag threshold for the tagged flow can be determined. In one example, a flow's de-tag threshold may be configured a priori based on factors that include, but are not limited to one or more of QoS, SLA settings, traffic type, application type, and/or historical data. In at least one embodiment, the de-tag threshold for the flow is determined by accessing a lookup table or other storage structure (e.g., tag/de-tag threshold data 32) to retrieve the appropriate de-tag threshold configured for the flow or the class of flows associated with the flow (e.g., all video flows from a particular provider configured with the same de-tag threshold).

In at least one other embodiment, some de-tag thresholds for flows may be configured dynamically. For example, when historical data is recorded and indicates a particular set of events, then the flow's de-tag threshold may be dynamically changed. To illustrate this example, if a particular flow has been tagged, de-tagged, and then tagged again within 2 hours, then the de-tag threshold may be decreased so that a lower threshold must be met before allowing the flow to be de-tagged again.

At 408, a dynamic determination is made as to whether the packet error rate for the flow satisfies the de-tag threshold for the flow. In at least one implementation, the de-tag threshold for the flow is lower than the tag threshold for the flow. Thus, a flow may not be de-tagged until it achieves a packet error rate that is lower than the packet error rate that caused the flow to be tagged. Additionally, in one or more embodiments, a de-tag threshold may not be satisfied unless the packet error rate has been maintained for a certain period of time. In one or more embodiments, satisfying the de-tag threshold may require a specified number of successive packet error rates to be equal or be less than the de-tag threshold. One or both of these requirements may be implemented. Both of these requirements help avoid a situation where a flow is tagged and de-tagged repeatedly.

If the flow's packet error rate does not satisfy the flow's de-tag threshold, then at 412, certain counts can be cleared or reset. For example, a flow packet loss count and a total flow packets transmitted count for the tagged flow, which may be used to calculate the packet error rate over a period of time for the tagged flow, may set to zero or may be reset to enable a new packet error rate for the tagged flow to be calculated over a second, overlapping period of time that has not yet ended.

If the flow's packet error rate satisfies the flow's tag threshold, as determined as 408, then at 410, the tagged flow is de-tagged. Essentially, the indication that the flow is tagged is revoked. For example, if the tagged flow is identified in tagged cable modems and flows lookup table 36, then the identification of the flow can be removed or an indication associated with the identification of the flow can be changed. When the flow is no longer tagged, the packets of the flow are not forwarded to the selective proxy and proxy functions are not performed on the flow. At 412, the flow packet loss count and the total flow packets transmitted count, which may be used to calculate the packet error rate for that tagged flow, are cleared or reset, as previously described.

Variations and Implementations

In example implementations, at least some portions of the activities related to the system for discovering and verifying the HFC topology of a cable network outlined herein may be implemented in software in, for example, CMTS 14, flow monitor 23, selective proxy 25, MAC scheduler 26, amplifiers 20, transceiver 18, fiber node/remote PHY device 19, cable modems 21, and content server 7. In some embodiments, one or more of these features may be implemented in hardware, provided external to these elements, or consolidated in any appropriate manner to achieve the intended functionality. The system may include software (or reciprocating software) that can coordinate in order to achieve the operations, as outlined herein. In still other embodiments, these elements may include any suitable algorithms, hardware, software, components, firmware, modules, interfaces, or objects that facilitate the operations thereof.

Furthermore, elements herein including, but not limited to, CMTS 14, flow monitor 23, selective proxy 25, and MAC scheduler 26, and cable modems 21 may also include suitable interfaces for receiving, transmitting, and/or otherwise communicating data or information in a network environment. Additionally, some of the processors and memory elements associated with the various nodes may be removed, or otherwise consolidated such that a single processor and/or a single memory location are responsible for certain activities. Alternatively, some of the processors and memory elements associated with the various nodes may be partitioned or otherwise divided such that more than one processor and/or memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., memory element 28) can store data used for the operations described herein. This includes the memory element being able to store instructions (e.g., software, logic, code, etc.) in non-transitory media such that the instructions are executed to carry out the activities described in this Specification. A processor can execute any type of instructions associated with the data to achieve the operations detailed herein in this specification. In one example, one or more processors (e.g., processor 27) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Elements of communication system 10 (e.g., CMTS 14, flow monitor 23, selective proxy 25, MAC scheduler 26, etc.) may keep information in any suitable type of memory (e.g., random access memory (RAM), read-only memory (ROM), erasable programmable ROM (EPROM), electrically erasable programmable ROM (EEPROM), etc.), software, hardware, firmware, or in any other suitable component, device, element, or object where appropriate and based on particular needs. The information being read, used, tracked, sent, transmitted, communicated, received or stored in communication system 10 could be provided in any database, register, queue, table, cache, buffer, control list, or other storage structure, based on particular needs and implementations, all of which can be referenced at any suitable timeframe. Any of the memory items and storage structures discussed herein (e.g., memory element 28, tag and de-tag threshold data 32, backup packets buffer 34, tagged CMs and flows lookup table 36, etc.) should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more nodes or other elements. However, this has been done for purposes of clarity and example only. It should be appreciated that the system can be consolidated in any suitable manner. Along similar design alternatives, any of the illustrated nodes, computers, modules, components, and elements of the FIGURES may be combined in various possible configurations, all of which are clearly within the broad scope of this specification. In certain cases, it may be easier to describe one or more of the functionalities of a given set of operations by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations described with reference to the preceding FIGURES illustrate only some of the possible scenarios that may be executed by, or within, the communication system. Some of these operations may be deleted or removed where appropriate, or these operations may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain standards and protocols (e.g. DOCSIS 3.1, TCP/IP), communication system 10 may be applicable to other exchanges, standards, cable network protocols, routing protocols, or other communication protocols. Moreover, although communication system 10 has been illustrated with reference to particular elements and operations that facilitate the communication process, these elements and operations may be replaced by any suitable architecture or process that achieves the intended functionality of communication system 10.

As used herein, unless expressly stated to the contrary, use of the phrase 'at least one of' or 'one or more of' refers to any combination of the named elements, conditions, or activities. For example, 'at least one of X, Y, and Z' or 'one or more of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Additionally, note that in this specification, references to various features (e.g., elements, structures, modules, components, steps, operations, characteristics, etc.) included in 'one embodiment,' 'example embodiment,' 'an embodiment,' 'at least one embodiment,' 'another embodiment,' 'some embodiments,' 'various embodiments,' 'other embodiments,' 'alternative embodiment,' etc. are intended to mean that any such features are included in one or more embodiments of the present disclosures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    calculating a first packet error rate (PER) of a flow sent from a source to a cable modem over a first period of time in a full duplex cable network;
    tagging the flow based on determining the first PER of the flow satisfies a tag threshold associated with the flow;
    intercepting, at a selective proxy, a packet of the tagged flow;
    storing a backup of the packet;
    transmitting the packet to the cable modem;
    determining the cable modem did not receive the packet;
    retransmitting the backup of the packet to the cable modem;
    dynamically calculating a second PER of the tagged flow based on a second period of time that ends after the first period of time ends;
    determining the second PER of the tagged flow satisfies a de-tag threshold; and
    revoking the tagging of the flow based, at least in part, on determining the second PER satisfies the de-tag threshold.

2. The method of claim 1, wherein the packet of the tagged flow is intercepted by the selective proxy based on the flow being tagged.

3. The method of claim 1, wherein the de-tag threshold is lower than the tag threshold.

4. The method of claim 1, wherein the revoking the tagging of the flow is based, in part, on determining one or more other packet error rates (PERs) of the tagged flow satisfy the de-tag threshold.

5. The method of claim 1, wherein the tag threshold is configured for the flow, and wherein the de-tag threshold is configured for the flow.

6. The method of claim 1, further comprising:
    receiving an acknowledgement message from the cable modem indicating the cable modem received the backup packet; and
    deleting the stored backup packet.

7. The method of claim 1, wherein the determining the packet was not received by the cable modem includes at least one of receiving a duplicate message indicating a different packet of the flow was received by the cable modem and determining a message acknowledging receipt of the packet was not received from the cable modem within a timeout period.

8. The method of claim 1, wherein the tag threshold is based on at least one of a quality of service (QoS) setting associated with the flow, a service level agreement (SLA) associated with the cable modem, historical data associated with the cable modem, historical data associated with the flow, network traffic type associated with the flow, and an application type associated with the flow.

9. The method of claim 1, further comprising:
    prior to determining the cable modem did not receive the packet, sending from the selective proxy to the source of the packet, a message indicating the packet was received by the cable modem.

10. The method of claim 1, further comprising:
    prior to determining that the first PER of the flow satisfies a tag threshold, dynamically determining the tag threshold.

11. The method of claim 1, wherein the tag threshold is dynamically determined based, at least in part, on historical data associated with cable modem.

12. The method of claim 1, wherein tagging the flow includes recording an identifier of the flow.

13. At least one non-transitory computer readable media comprising instructions for execution, and when executed by at least one processor, cause the at least one processor to:
    calculate a first packet error rate (PER) of a flow sent from a source to a cable modem in a full duplex cable network, wherein calculating the first PER comprises:
        calculating a first count of packets from the flow that were not received by the cable modem during the first period of time,
        calculating a second count of total packets in the flow that were transmitted to the cable modem during the first period of time, and
        determining a ratio of the first count to the second count;
    tag the flow based on determining the first PER of the flow satisfies a tag threshold associated with the flow;
    intercept, at a selective proxy, a packet of the tagged flow;
    store a backup of the packet;
    transmit the packet to the cable modem;
    determine the cable modem did not receive the packet; and
    retransmit the backup of the packet to the cable modem.

14. The at least one non-transitory computer readable claim 13, wherein the instructions, when executed by the at least one processor, cause the at least one processor to:

dynamically calculate a second PER of the tagged flow based on a period of time that ended after the first PER was calculated;

determine the second PER of the tagged flow satisfies a de-tag threshold; and revoke the tagging of the flow based, at least in part, on determining the second PER satisfies the de-tag threshold.

15. A system comprising:

a memory storage; and a processing unit coupled to the memory storage, wherein the processing unit is operative to:

calculate a first packet error rate (PER) of a flow sent from a source to a cable modem over a first period of time in a full duplex cable network;

tag the flow based on determining the first PER of the flow satisfies a tag threshold associated with the flow;

intercept, at a selective proxy, a packet of the tagged flow;

store a backup of the packet;

transmit the packet to the cable modem;

determine the cable modem did not receive the packet;

retransmit the backup of the packet to the cable modem;

dynamically calculate a second PER of the tagged flow based on a second period of time that ends after the first period of time ends;

determine the second PER of the tagged flow satisfies a de-tag threshold; and revoke the tagging of the flow based, at least in part, on determining the second PER satisfies the de-tag threshold.

16. The system of claim 15, wherein the packet of the tagged flow is intercepted by the selective proxy based on the flow being tagged.

17. The system of claim 15, wherein the de-tag threshold is lower than the tag threshold.

18. The system of claim 15, wherein the revoking the tagging of the flow is based, in part, on determining one or more other packet error rates (PERs) of the tagged flow satisfy the de-tag threshold.

19. The system of claim 15, wherein the tag threshold is configured for the flow, and wherein the de-tag threshold is configured for the flow.

20. The system of claim 15, wherein the processing unit is further operative to:

receive an acknowledgement message from the cable modem indicating the cable modem received the backup packet; and delete the stored backup packet.

21. The system of claim 15, wherein the tag threshold is based on at least one of a quality of service (QoS) setting associated with the flow, a service level agreement (SLA) associated with the cable modem, historical data associated with the cable modem, historical data associated with the flow, network traffic type associated with the flow, and an application type associated with the flow.

22. The system of claim 15, wherein the processing unit is further operative to prior to determining the cable modem did not receive the packet, send from the selective proxy to the source of the packet, a message indicating the packet was received by the cable modem.

23. The system of claim 15, wherein the processing unit is further operative to prior to determining that the first PER of the flow satisfies a tag threshold, dynamically determine the tag threshold.

24. The system of claim 15, wherein the tag threshold is dynamically determined based, at least in part, on historical data associated with cable modem.

25. The system of claim 15, wherein tagging the flow includes recording an identifier of the flow.

* * * * *